(12) United States Patent
Allen

(10) Patent No.: US 10,509,189 B2
(45) Date of Patent: Dec. 17, 2019

(54) TRAY ASSEMBLY FOR A FIBER OPTIC SYSTEM

(71) Applicant: CommScope Technologies LLC, Hickory, NC (US)

(72) Inventor: Barry Wayne Allen, Siler City, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/762,970

(22) PCT Filed: Sep. 22, 2016

(86) PCT No.: PCT/US2016/053034
§ 371 (c)(1),
(2) Date: Mar. 23, 2018

(87) PCT Pub. No.: WO2017/053524
PCT Pub. Date: Mar. 30, 2017

(65) Prior Publication Data
US 2019/0086627 A1 Mar. 21, 2019

Related U.S. Application Data

(60) Provisional application No. 62/232,976, filed on Sep. 25, 2015.

(51) Int. Cl.
*G02B 6/44* (2006.01)
(52) U.S. Cl.
CPC ............. *G02B 6/4455* (2013.01); *G02B 6/44* (2013.01)

(58) Field of Classification Search
None
See application file for complete search history.

(56) References Cited

U.S. PATENT DOCUMENTS 5,080,459 A * 1/1992 Wettengel ............ G02B 6/4452
206/316.1
5,323,478 A * 6/1994 Milanowski ......... G02B 6/4452
385/135

(Continued)

FOREIGN PATENT DOCUMENTS

| EP | 0 717 860 B1 | 5/2000 |
|---|---|---|
| EP | 1 549 980 B1 | 12/2008 |
| WO | 2008/078058 A1 | 7/2008 |

OTHER PUBLICATIONS

International Search Report and Written Opinion for the International Searching Authority for corresponding International Patent Application No. PCT/US2016/053034 dated Nov. 30, 2016, 11 pages.

*Primary Examiner* — Michael Stahl
(74) *Attorney, Agent, or Firm* — Merchant & Gould P.C.

(57) ABSTRACT

A tray assembly for a fiber optic system to organize optical fibers. The tray assembly includes a backbone structure with a plurality of backbone segments that are connected together and are positioned along an expansion/contraction axis of the backbone structure. The tray assembly also includes a stack of fiber management trays that are connected to the backbone structure. Each of the fiber management trays are pivotally connected to the backbone segments at a pivot axis. The backbone segments are moveable relative to one another along the expansion/contraction axis to allow the backbone structure to be moved between an expanded state and a contracted state.

13 Claims, 24 Drawing Sheets

(56) References Cited

U.S. PATENT DOCUMENTS

| | | | | |
|---|---|---|---|---|
| 5,481,639 A * | 1/1996 | Cobb | .................... | G02B 6/4442 |
| | | | | 385/135 |
| 5,619,608 A * | 4/1997 | Foss | ..................... | G02B 6/4442 |
| | | | | 206/557 |
| 6,061,492 A | 5/2000 | Strause et al. | | |
| 6,263,141 B1 | 7/2001 | Smith | | |
| 6,810,193 B1 * | 10/2004 | Muller | ................. | G02B 6/4454 |
| | | | | 385/134 |
| 9,395,507 B1 * | 7/2016 | Gross | .................... | G02B 6/4446 |
| 2004/0120680 A1 * | 6/2004 | Dillat | .................. | G02B 6/4455 |
| | | | | 385/135 |
| 2004/0247277 A1 * | 12/2004 | Spayes | ................ | G02B 6/4452 |
| | | | | 385/135 |
| 2009/0290842 A1 * | 11/2009 | Bran de Leon | ...... | G02B 6/4454 |
| | | | | 385/135 |
| 2013/0105420 A1 * | 5/2013 | Ray | ..................... | G02B 6/4454 |
| | | | | 211/13.1 |
| 2013/0188919 A1 * | 7/2013 | Cubala | ................ | G02B 6/4439 |
| | | | | 385/135 |

* cited by examiner

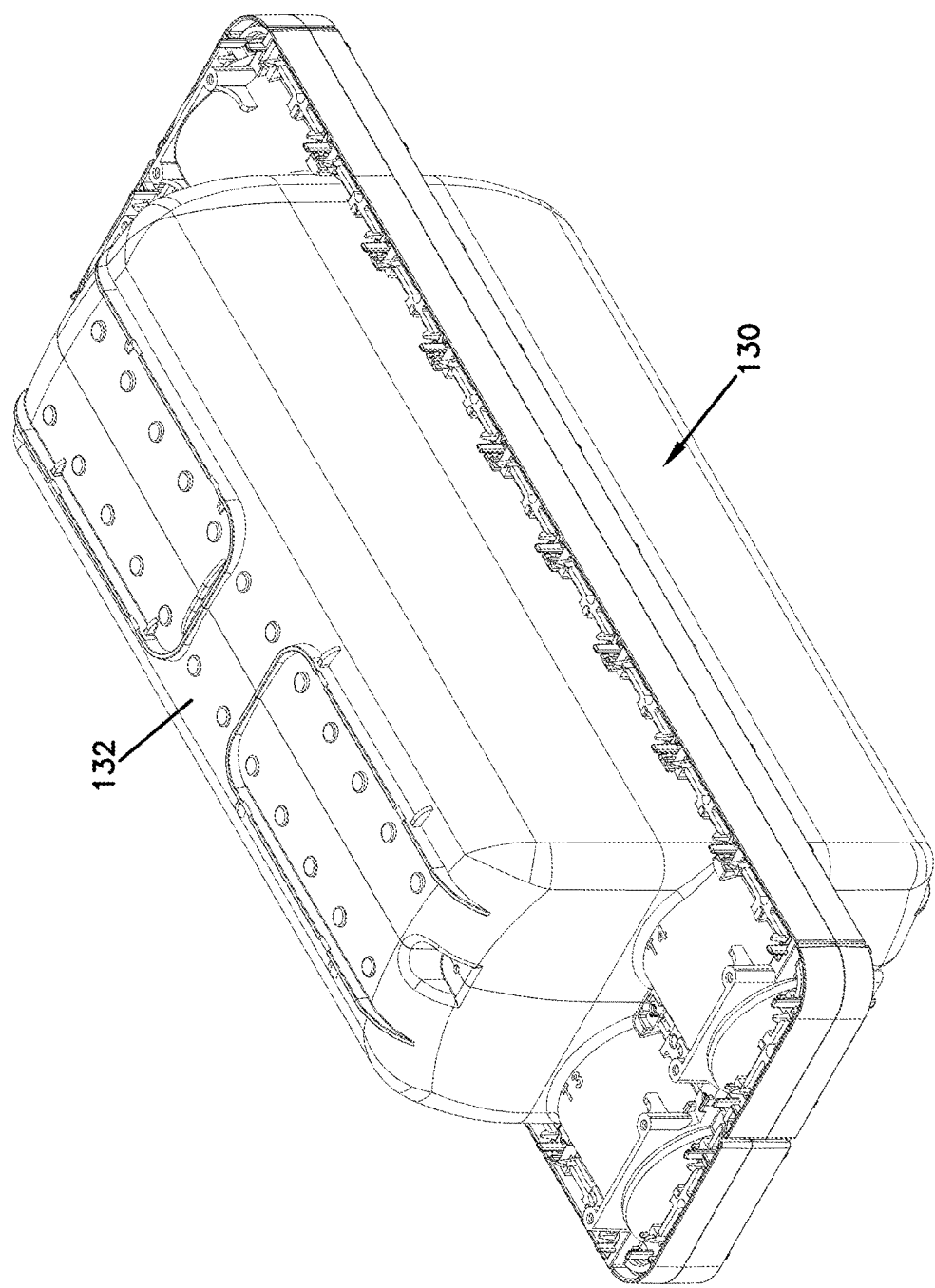

TRAY ASSEMBLY FOR A FIBER OPTIC SYSTEM

CROSS-REFERENCE TO RELATED APPLICATION

This application is a U.S. National Stage Application of PCT/US2016/053034, filed on Sep. 22, 2016, which claims the benefit of U.S. Patent Application Ser. No. 62/232,976, filed on Sep. 25, 2015, the disclosures of which are incorporated herein by reference in their entireties. To the extent appropriate, a claim of priority is made to each of the above disclosed applications.

TECHNICAL FIELD

The present disclosure relates generally to optical fiber storage. More particularly, the present disclosure relates to a system for optical fiber storage that can be manipulated for more convenience access.

BACKGROUND

Fiber optic trays are used to manage optical fibers associated with optical components such as splices, passive optical splitters and wavelength diversion multi-plexers. Fiber optic trays are often arranged in pivotal stacks. Accordingly, in this area there is a need to increase density while still providing ready accessibility to individual trays.

SUMMARY

In one aspect, the present disclosure relates to a tray assembly for a fiber optic system to organize optical fibers. The tray assembly includes a backbone structure with a plurality of backbone segments that are connected together and are positioned along an expansion/contraction axis of the backbone structure. The tray assembly also includes a stack of fiber management trays that are connected to the backbone structure. Each of the fiber management trays are pivotally connected to the backbone segments at a pivot axis. The backbone segments are moveable relative to one another along the expansion/contraction axis to allow the backbone structure to be moved between an expanded state and a contracted state. The backbone structure have a longer length measured along the expansion/contraction axis in the expanded state as compared to the contracted state. The pivot axes of the fiber management trays are closer together when the backbone structure is in the contracted state as compared to the expanded state.

In another aspect, the present disclosure relates to a tray assembly for a fiber optic system. The tray assembly includes a pivot mount. The tray assembly also includes a stack of fiber management trays that are connected to the pivot mount. The fiber management trays are individually pivotally connected to the pivot mount at a first pivot axis by separate pivot linkages. The pivot linkages are configured to allow the trays to pivot about the first pivot axis to individually pivot the fiber management trays from stowed positions aligned with the stack to working positions offset from stack. The pivot linkages also are configured to allow the trays to pivot about second pivot axes after the trays have been pivoted out from the stack to the working positions. The fiber management trays are positioned adjacent one another along a length of the first pivot axis when in the stowed positions. The second pivot axes each correspond to one of the fiber management trays and are spaced apart from one another along the length of the first pivot axis.

In a still further aspect, the present disclosure relates to a method for storing a stack of optical fiber management trays. The method includes securing the stack of optical fiber management trays to pivot axes that allows the optical fiber management trays to individually pivot with respect to each other. The method also includes securing the pivot axes to a base with a connectors to retain the optical fiber management trays in pivotal alignment with respect to each other.

BRIEF DESCRIPTION OF THE DRAWINGS

FIG. 29 shows a perspective view of the fiber tray storage cabinet shown in FIG. 28, shown closed with the top half of the fiber tray storage cabinet.

DESCRIPTION

Figure 1:
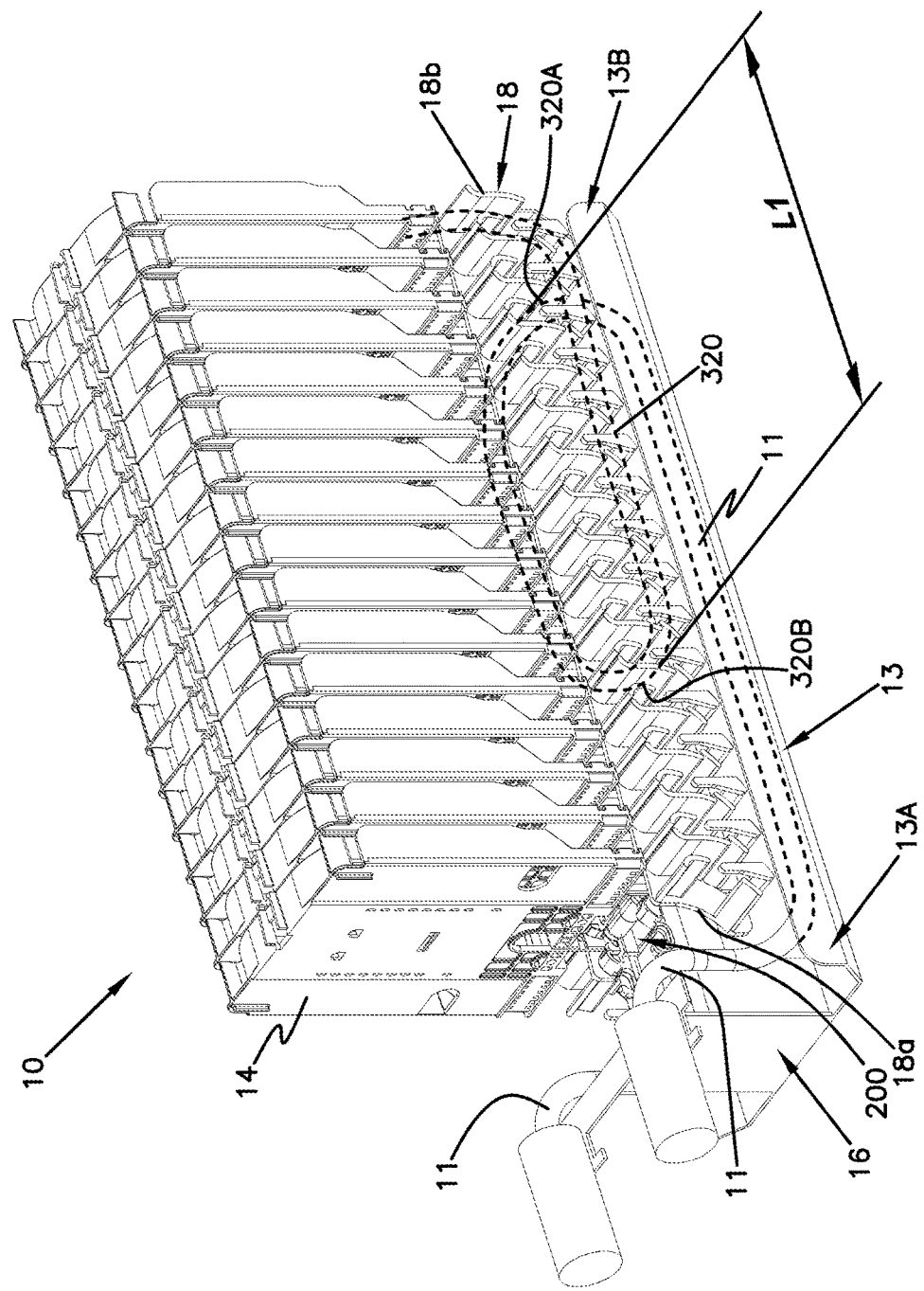
FIG. 1 shows a perspective view of a tray assembly for a fiber optic system according to an example embodiment of the present disclosure, showing the tray assembly in a stored position on an expansion/contraction guide and directing a cable along a basket.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIGS. 1-8 depict an example tray assembly 10 for optical fiber storage that provides greater access to the stored optical fibers. As shown, the tray assembly 10 includes a backbone structure 12 operable through a plurality of backbone segments 18 that are connected together and are positioned along the axis of an expansion and contraction guide 16. The expansion and contraction guide 16 can be set or secured within a basket 13 that has a channel extending along both sides of the guide. As shown, a fiber optic structure is supported in a looped condition within the channels of the basket 13 so that a cable can expand and contract.

A stack of fiber management trays 14 can be connected to the backbone structure 12. Each of the fiber management trays 14 can be pivotally mounted to the backbone structure 12 at a pivot axis 55 (see FIG. 4) provided at a coupling interface 200 between the backbone segments 18.

Figure 2:
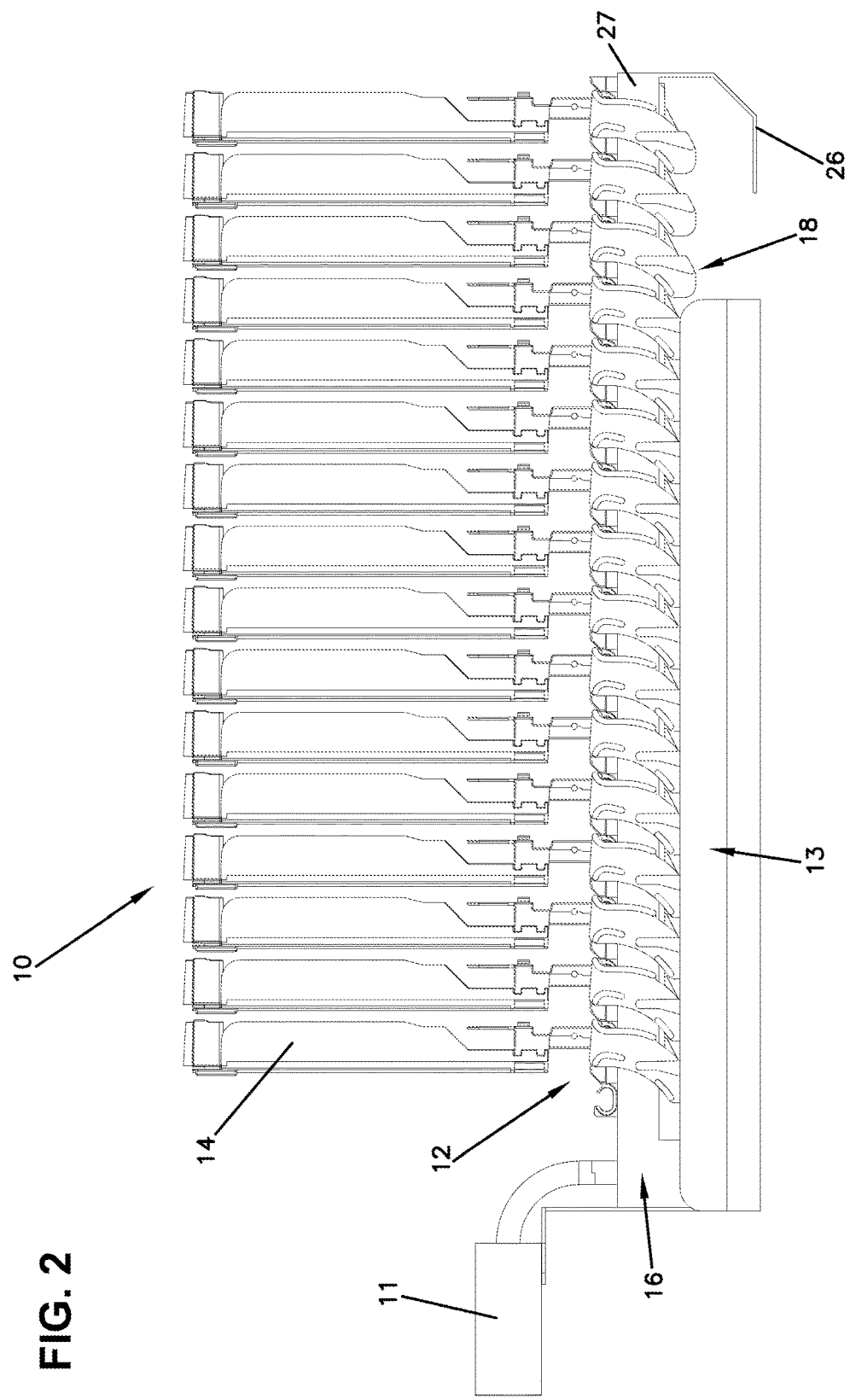
FIG. 2 shows a side view of the tray assembly in a stored position as shown in FIG. 1.
Figure 3:
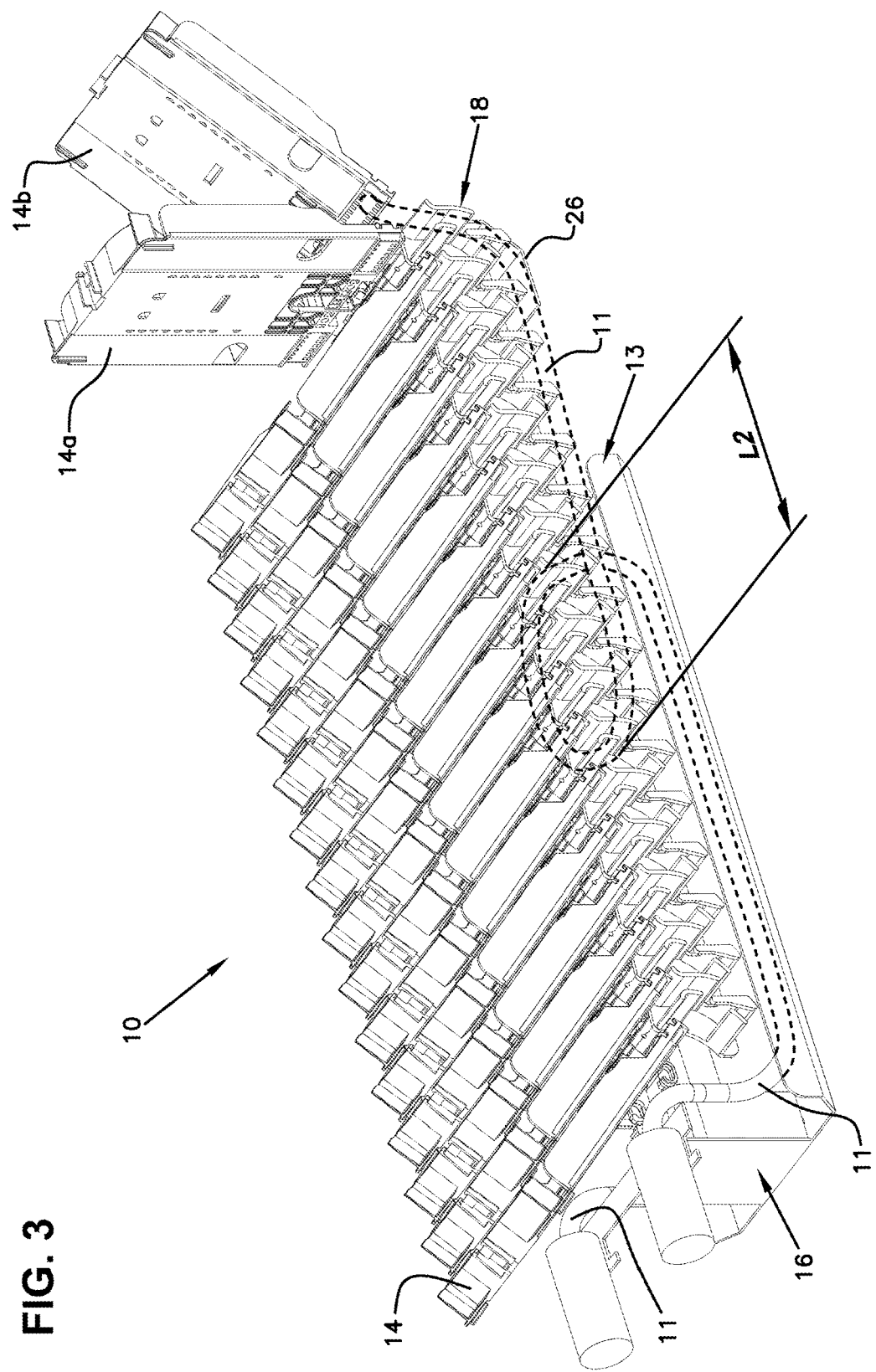
FIG. 3 shows a perspective view of the tray assembly shown in FIG. 1, showing the tray assembly expanded in an expanded position.
Figure 4:
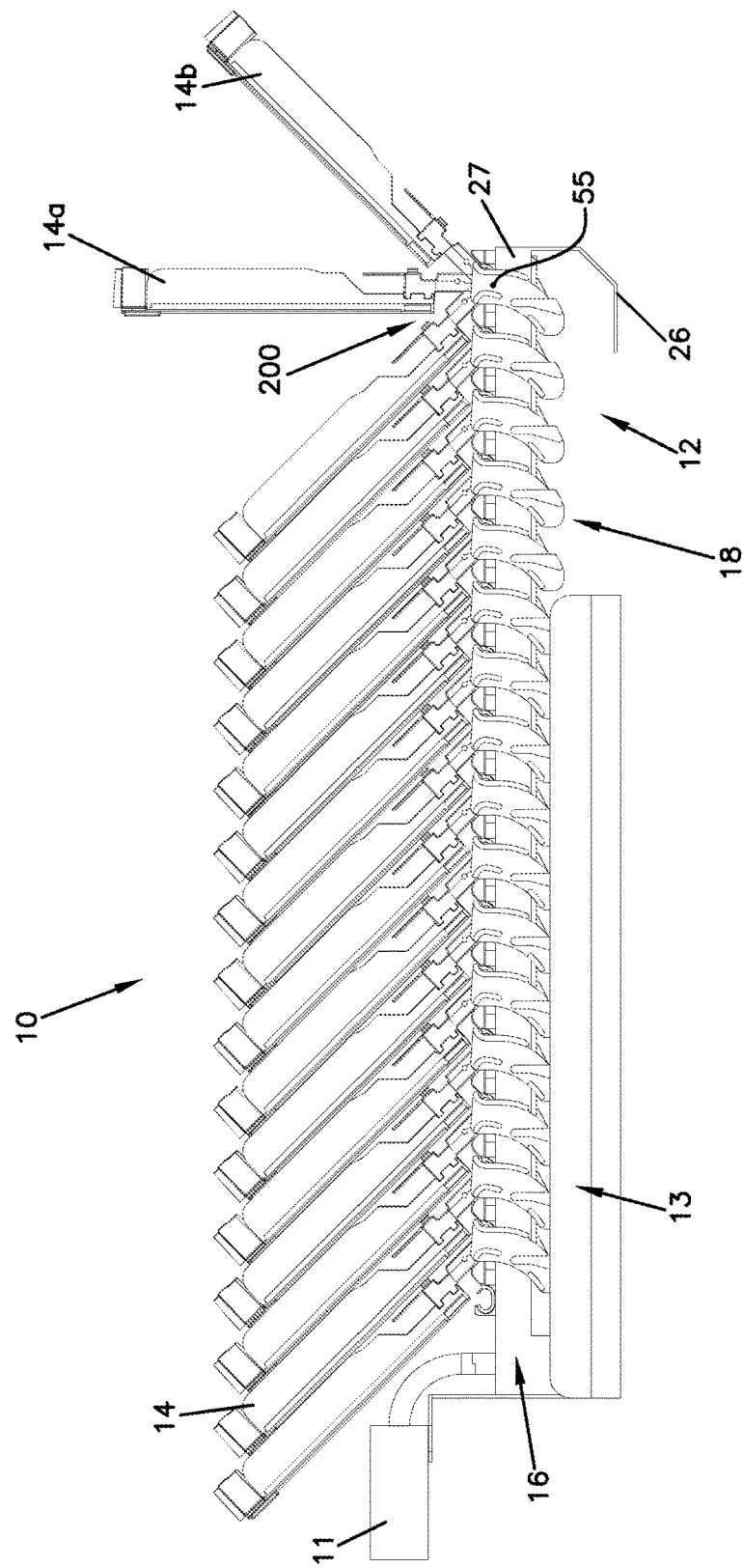
FIG. 4 shows a side view of the tray assembly in an expanded position as shown in FIG. 3.
Figure 5:
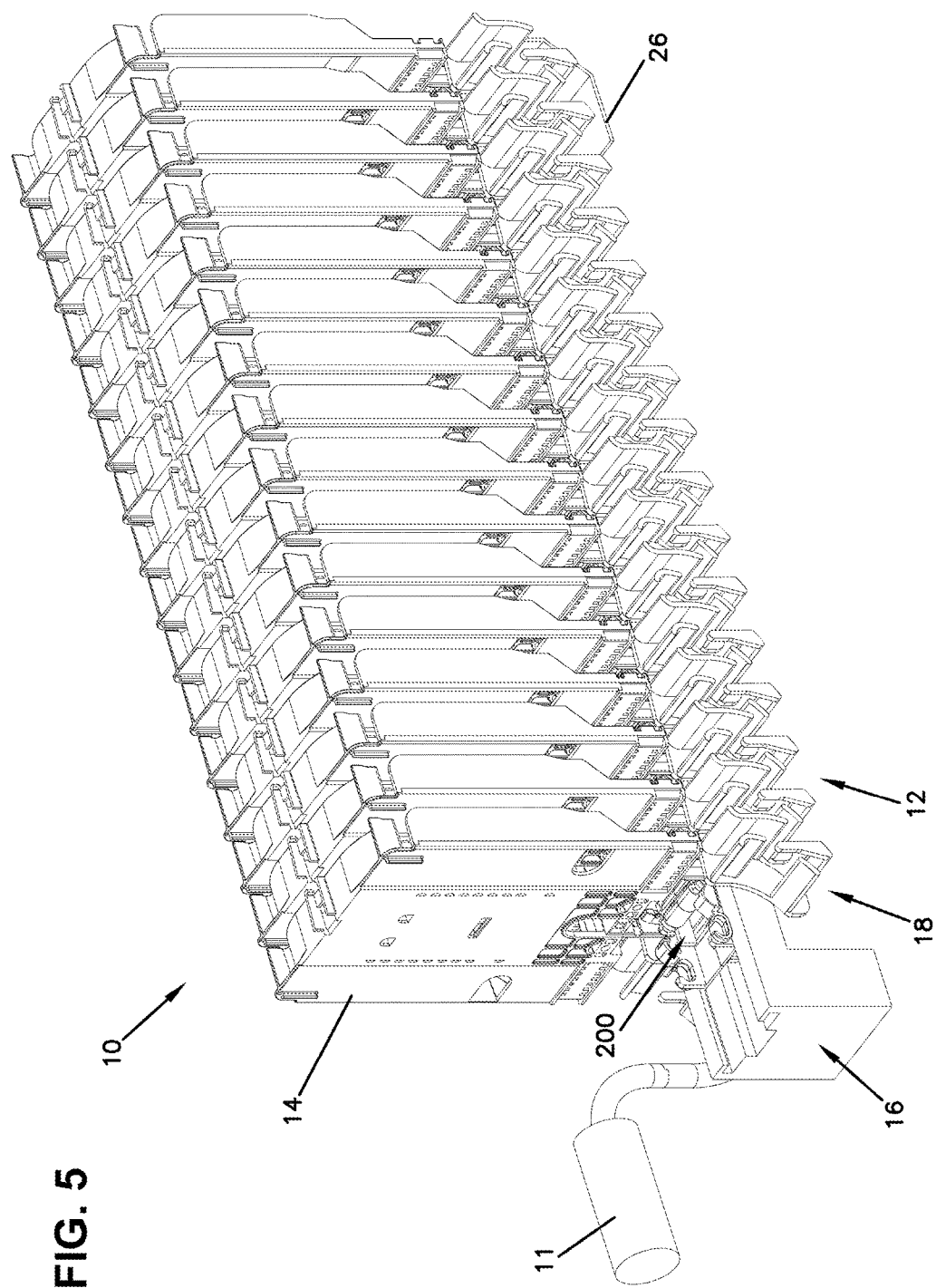
FIG. 5 shows a perspective view of the tray assembly in a stored position as shown in FIG. 1, showing the tray assembly removed from the basket and only showing one cable.
Figure 6:
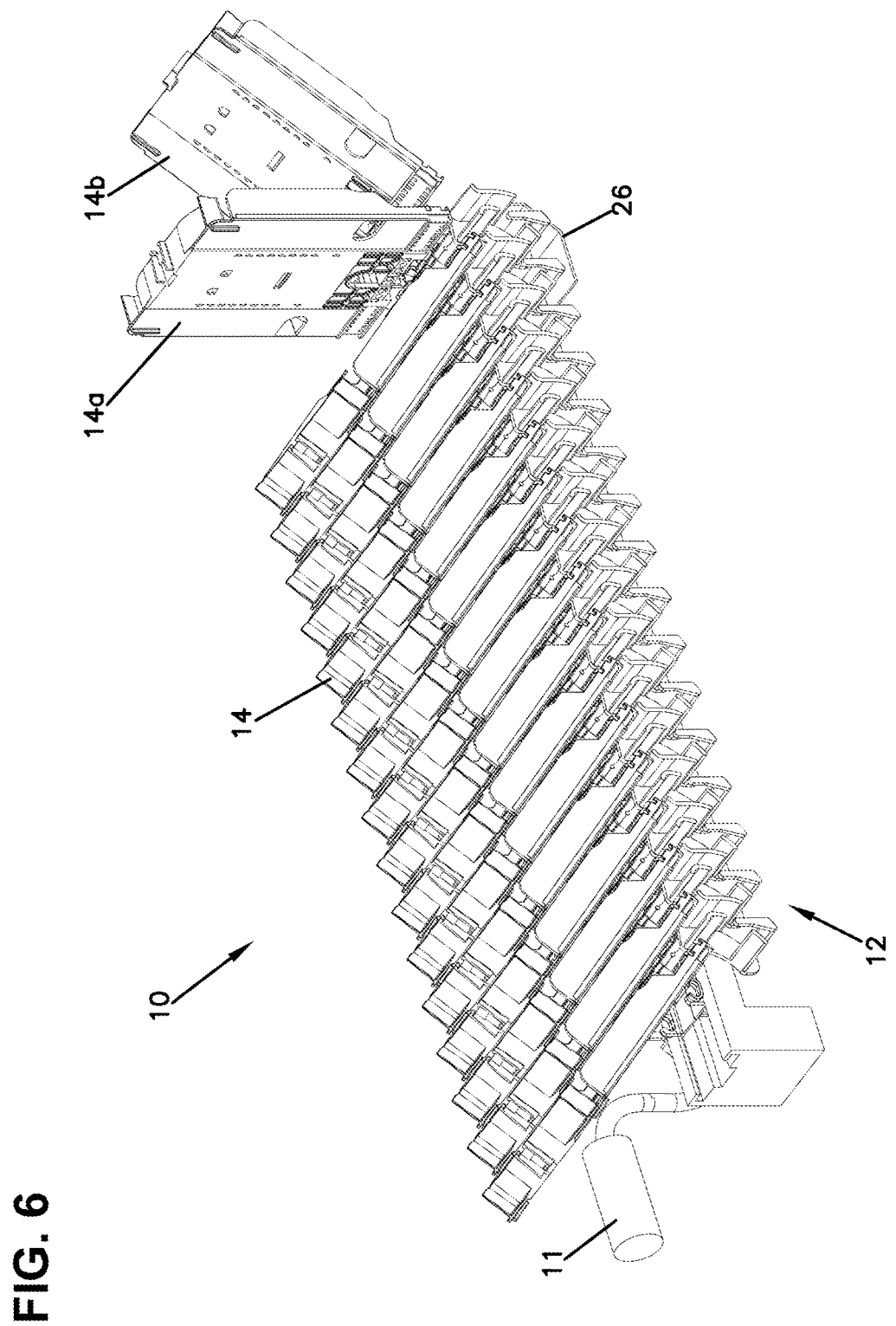
FIG. 6 shows the tray assembly as shown in FIG. 5 in an expanded position.

The backbone segments 18 are moveable relative to one another along the axis of the expansion and contraction guide 16 to allow the backbone structure 12 to be moved between an expanded state (FIGS. 3, 4 & 6) and a contracted state (FIGS. 1, 2 & 5). The backbone structure 12 can have a longer length measured along the axis of the expansion and contraction guide 16 in the expanded state as compared to the contracted state. The pivot axes 55 to which the fiber management trays 14 are mounted are closer together when the backbone structure 12 is in the contracted state as compared to the expanded state. In the expanded state, the fiber management trays 14 can pivot along a range of degrees, for example vertically 14a and opposite 14b to the rest of the trays. In the contracted state, the fiber management trays 14 can sit parallel to each other.

Figure 7:
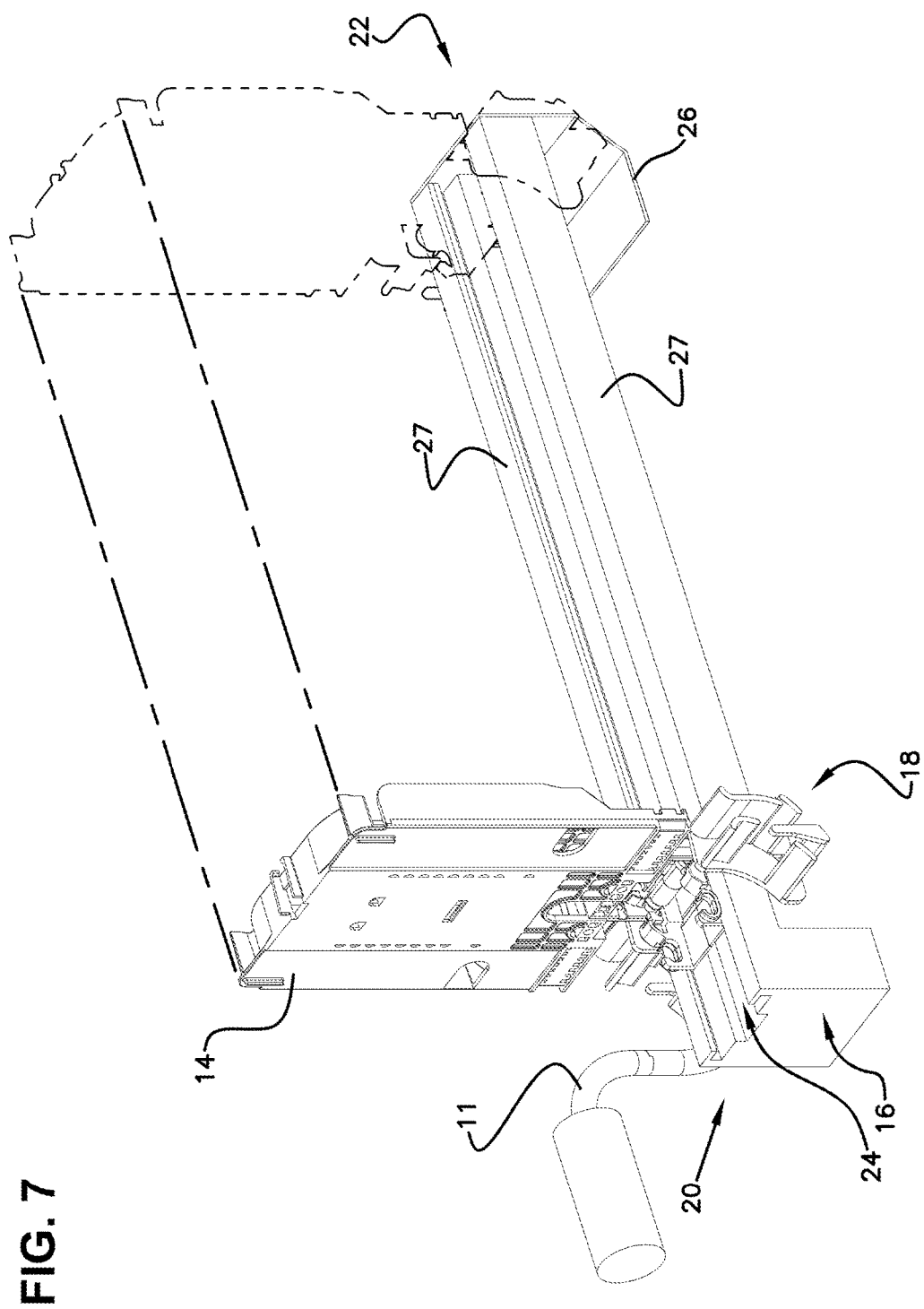
FIG. 7 shows a perspective view of the guide and cable shown in FIG. 5, showing a single isolated tray secured in the stored position along the expansion/contraction guide with a backbone segment.
Figure 8:
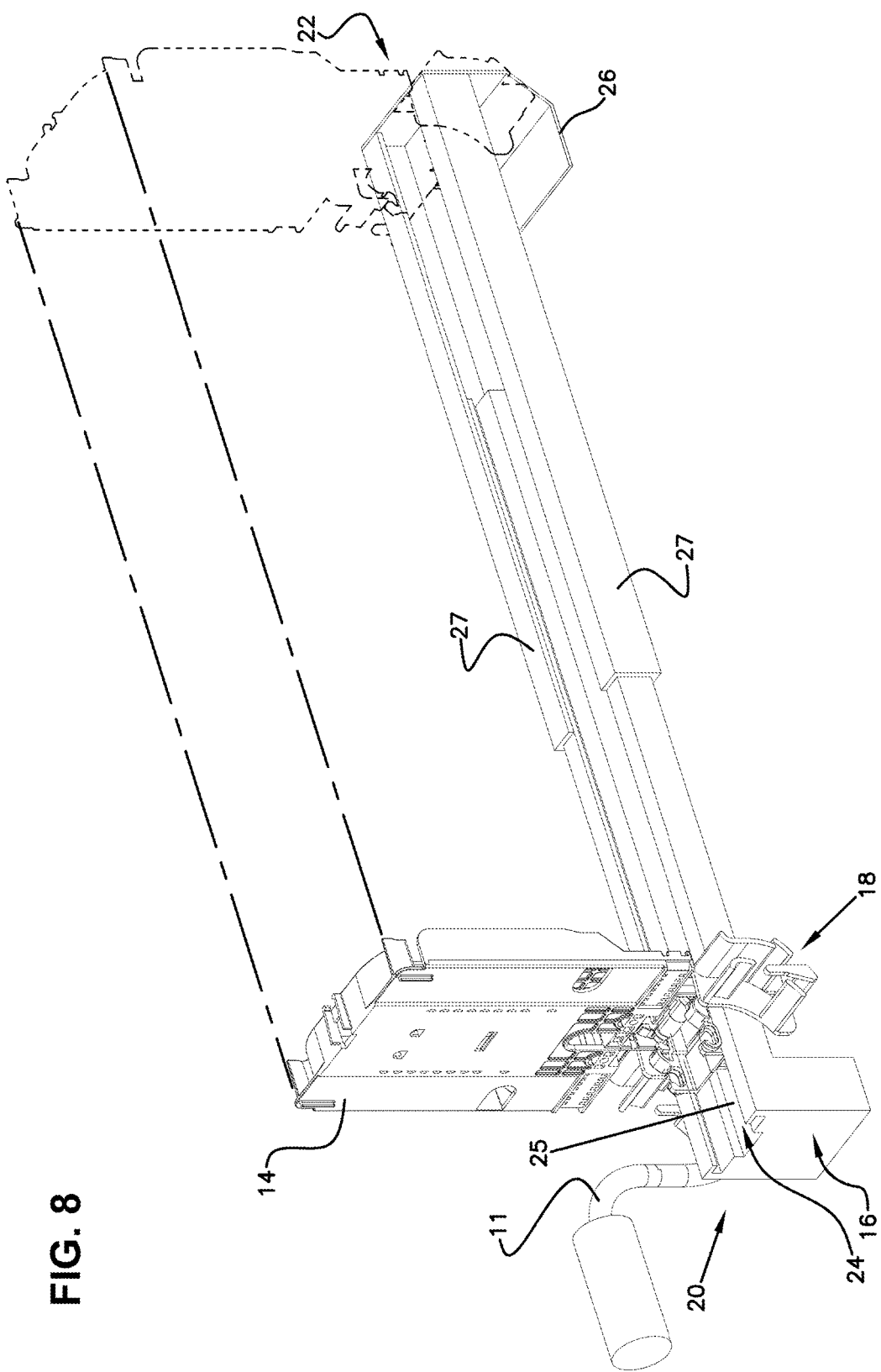
FIG. 8 shows a perspective view of the single isolated tray, expansion/contraction guide and cable shown in FIG. 7, shown in the expanded position.

FIGS. 7 & 8 particularly depict the contraction and expansion guide 16. The contraction and expansion guide 16 includes a track 24 that extends along an axis between a proximal end 20 and a distal end 22. As depicted, the track 24 can have an open top that extends along the length of the axis from the proximal end 20 to the distal end 22. The track 24 can include an elongate guide slot 25. The backbone segments 18 can freely travel to different positions along the axis of the track 24 during expansion and contraction.

An extender 27 is depicted to be supported to the outer surface of the guide 16. For example the extender 27 can include a lower base surface that extends across the underside of the guide 16, and a pair of opposing frames that fit around and over the sides of the guide. As depicted, the extender 27 includes an open top that does not restrict the open top of the guide 24. It is desired that the backbone segments 18, and pivotally secured fiber management trays 14, can freely travel along the open top of the extender 27 in a similar manner to travelling along the guide 24. As depicted, the extender 27 can adjust its position with respect to the guide 16 by telescoping back and forth with respect to the proximal end 24 of the guide. The distal end of the extender 27 can include a fiber guide 26. As shown, this guide 26 can have a curved shape that curves underneath the extender 27. Preferably, as particularly depicted in FIG. 1, a first backbone segment 18a along the backbone 12 is fixed to a position at the proximal end 24 of the track 24 of the guide 16 and a second backbone segment 18b along the backbone 12 is fixed to a position at the distal end 22. Thus, during expansion and contraction, the backbone 12 will telescope between these first and second backbone segments 18a, 18b.

Figure 9:
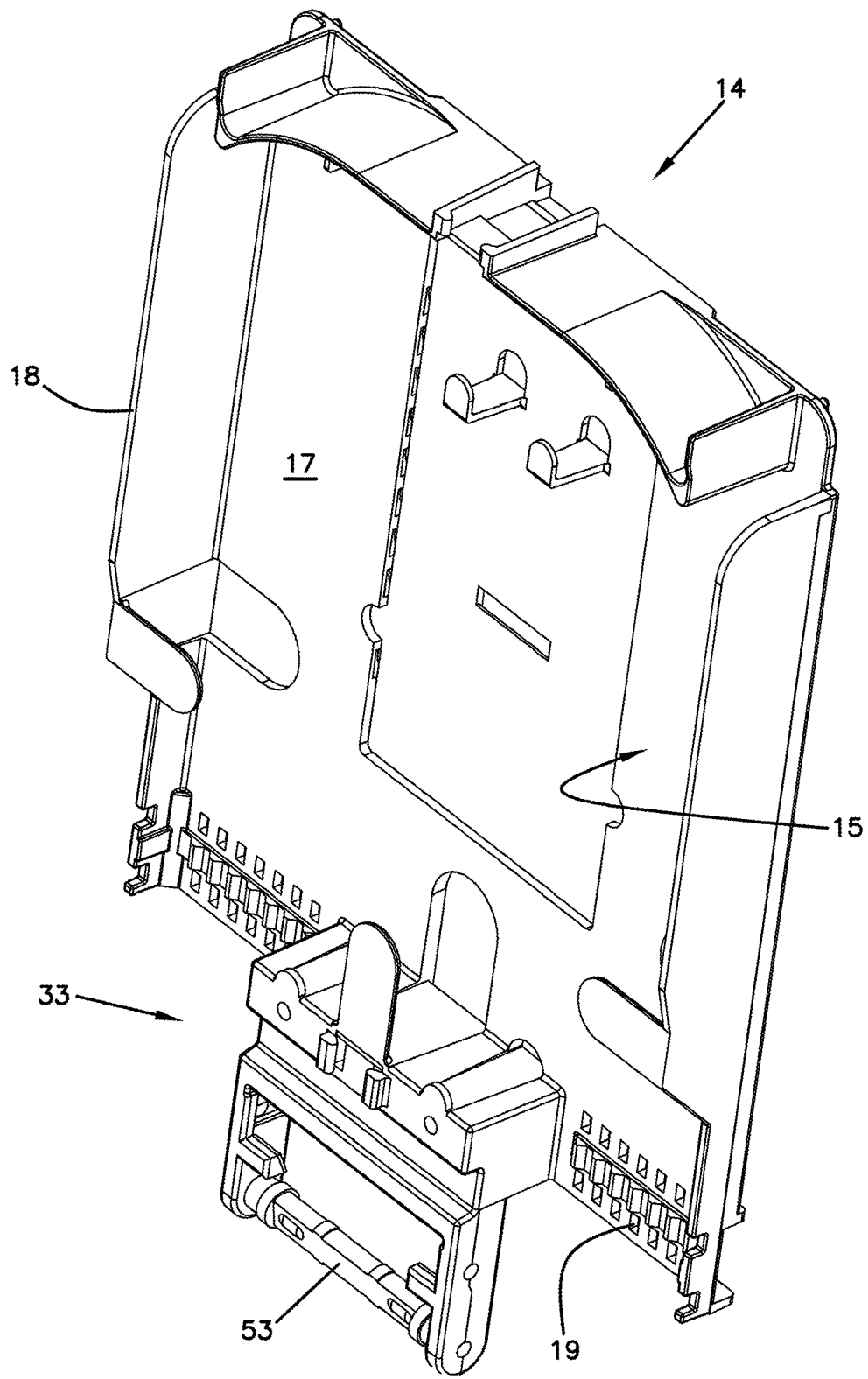
FIG. 9 shows an isolated perspective view of the tray shown in FIG. 1.

Referring to FIG. 9, the fiber management trays 14 can be configured for mounting or otherwise supporting fiber optic components such as optical fiber splices, passive optical splitters and wavelength division multiplexers. In certain examples, the fiber management trays 14 can include tray bodies 15 that define one or more fiber routing paths for storing excess lengths of optical fibers. In certain examples, the tray bodies 15 can include bend radius limiters, spools, partial spools, tabs or other structures for routing optical fibers. As depicted, the tray bodies 15 each include a main wall 17 and a side wall 18 that extends around a perimeter of the main wall 17 so as to define an at least partially enclosed region for managing optical fibers and other optical components. In certain examples, a plurality of tie-down locations 19 (e.g., openings for receiving tie-down straps) can be provided at lower ends of the tray bodies 15 for anchoring furcation tubes, buffer tubes, optical fibers or other structures to the tray bodies 15. The trays 14 also can include pivot mounts 33 attached to the tray bodies 15 adjacent the lower ends of the main bodies 15. The pivot mounts 33 can include pivot pins 53 fixed relative to the tray bodies 15.

The backbone structure 12 includes a plurality of backbone segments 18 (i.e., links) that are coupled together at least in part by the pivot pins 53 of the fiber management trays 14. The backbone segments 18 are coupled together at the coupling interfaces 200 (see FIGS. 15-21), which include the pivot pins 53. The coupling interfaces 200 allow adjacent backbone segments 18 to slide relative to one another along the expansion and contraction guide 16 as the backbone structure 12 is moved between the expanded state and the contracted state.

Figure 17:
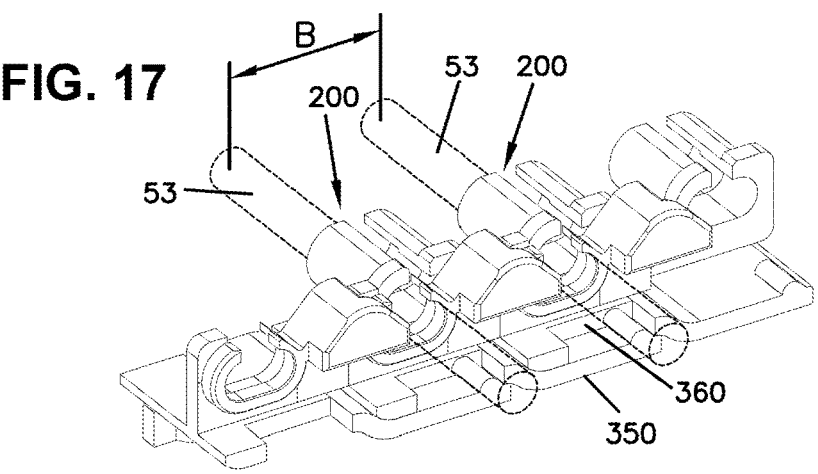
FIG. 17 shows a perspective view of the assembled second tray pivots shown in FIG. 16, showing the assembled second tray pivots in the stored position shown in FIGS. 1, 2 and 5 and the pins separated a distance B.
Figure 20:
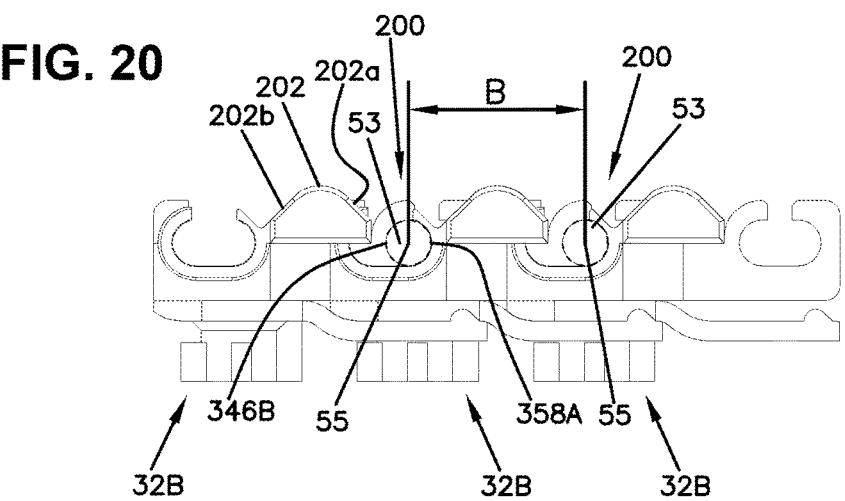
FIG. 20 shows a side view of the assembled second tray pivots in the stored position as shown in FIG. 17.

When the backbone structure 12 is in the contracted state, the pivot axes 55 of the pivot pins 53 are positioned in close proximity to one another such that the fiber management trays 14 are densely packed and are prevented from pivoting by interference between the adjacent fiber management trays 14. FIGS. 17 and 20 show portions of multiple backbone segments 18 in a contracted state where the pivot axes 55 are positioned at a spacing distance B which is sufficiently small that the trays 14 in the tray stack are densely packed and prevented from meaningful pivoting motion relative to one another.

Figure 18:
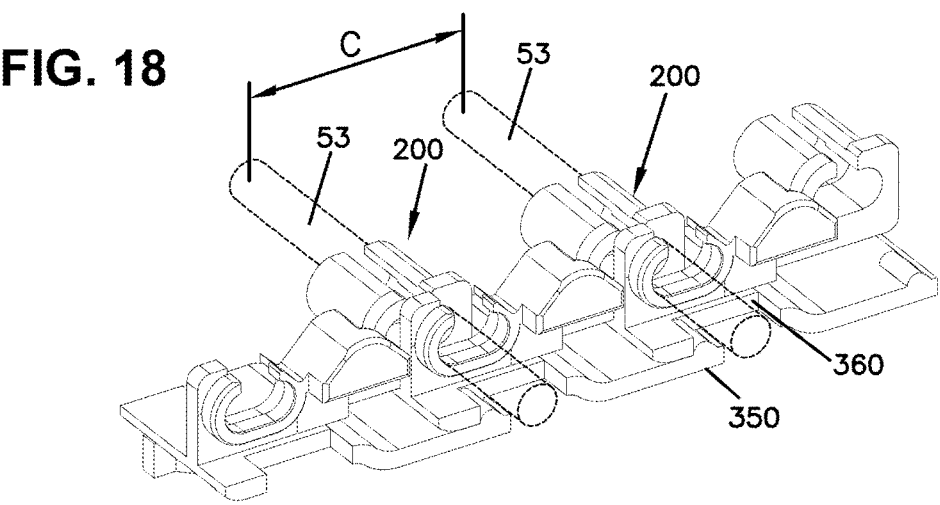
FIG. 18 shows a perspective view of the assembled second tray pivots shown in FIG. 16, showing the assembled second tray pivots in the expanded position shown in FIGS. 3, 4 and 6 and the pins separated a distance C.
Figure 21:
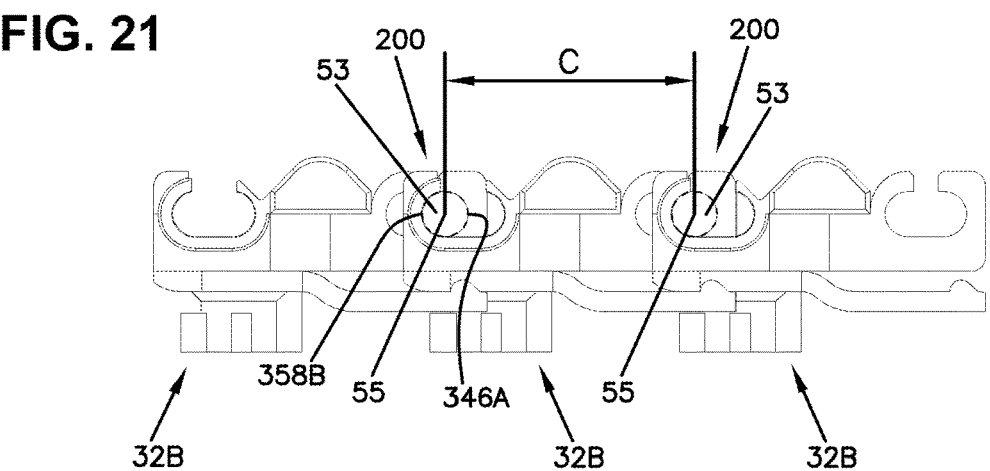
FIG. 21 shows a side view of the assembled second tray pivots in the expanded position as shown in FIG. 18.

When the backbone segments 18 are in the expanded state, the pivot axes 55 of the pivots pins 53 are far enough apart from one another to allow each of the fiber management trays 14 to be pivoted through a range of movement to allow ready access to any optical fibers or optical components bordered on the fiber management trays 14. FIGS. 18 and 21 show portions of multiple backbone segments 12 in an expanded state where the pivot axes 55 are positioned at a spacing distance C which is sufficiently large that the trays 14 in the tray stack are provided with enough space to allow each of the trays to be pivoted through a range of movement that allows access to fiber management portions of the trays. It will be appreciated that the spacing B is smaller than the spacing C.

In certain examples, the backbone segments 18 can include pivot limiters 202 positioned between the coupling interfaces 200. The pivot limiters 202 can be configured to limit the range of pivotal movement of the fiber management trays 14 when the backbone structure 12 is in the expanded state. In certain examples, the pivot limiters 202 limit each fiber management tray 14 to arrange a movement of at least 90 degrees.

It will be appreciated that the coupling interfaces 200 provide a dual function. First, the coupling interfaces function to couple the backbone segments 18 together while concurrently allowing adjacent backbone segments to slide relative to one another along the axes of the expansion and contraction guide 16. Second, when the backbone structure 18 is in the expanded state, the coupling interfaces 200 allow the fiber management trays 14 to be pivoted relative to one another and relative to the backbone segments through a range of movement that allows each of the fiber management trays to be readily accessed.

Figure 10:
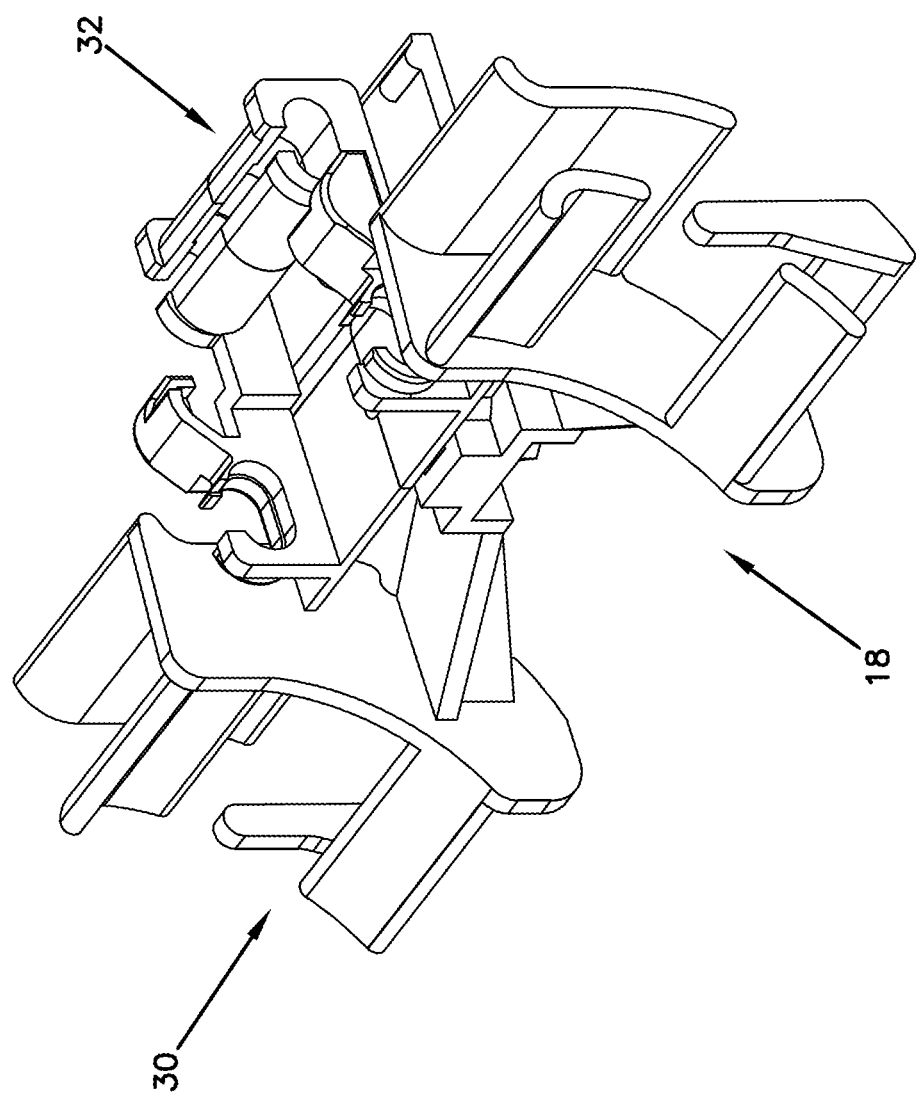
FIG. 10 shows an isolated perspective view of the backbone segment shown in FIGS. 7-8.
Figure 11:
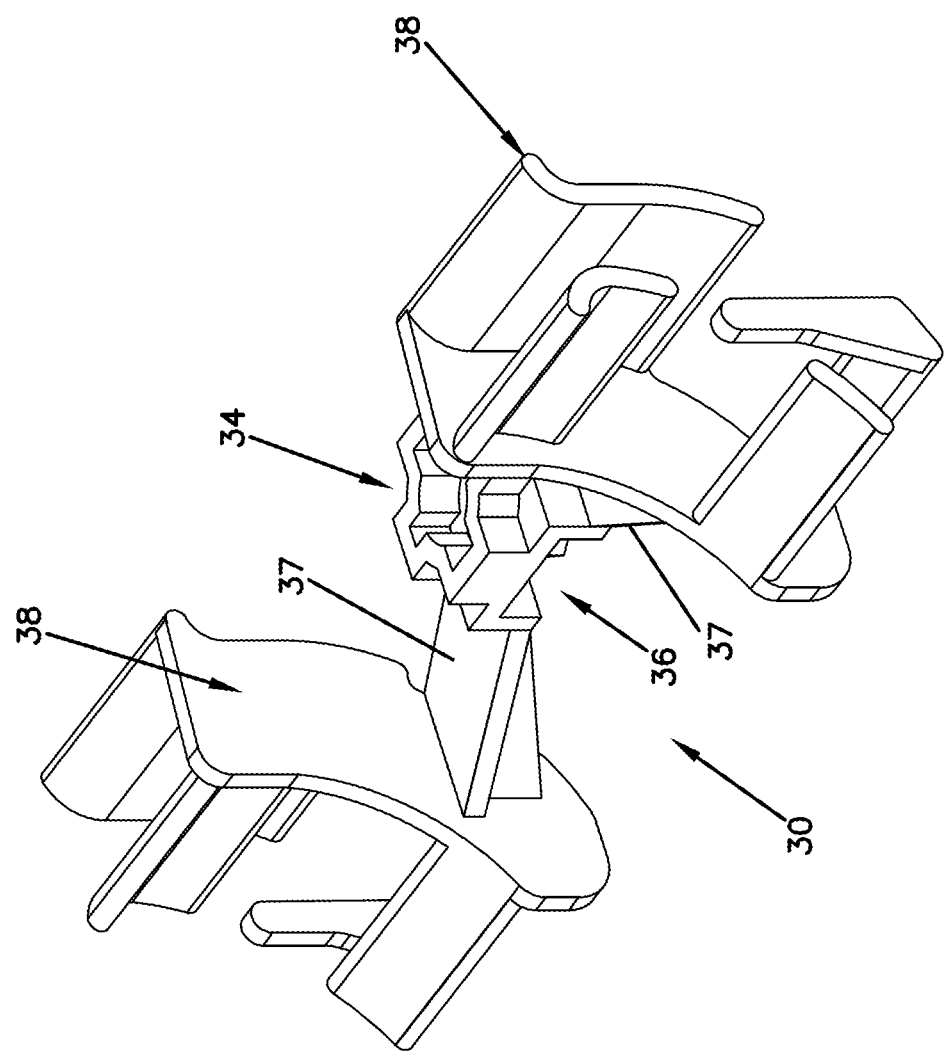
FIG. 11 shows an isolated perspective view of an expansion/contraction guide follower of the backbone segment shown in FIG. 10.

Referring to FIG. 10, each of the backbone segments 18 includes an upper section 32 secured to a lower section 30. When a given backbone segment 18 is secured to the expansion and contraction guide 16, the lower section 30 is mounted from beneath the expansion and contraction guide 16 and the upper section 32 is mounted from above the expansion and contraction guide 16 such that the expansion and contraction guide 16 is captured between the upper section 32 and the lower section 32. As shown at FIG. 11, the lower section 30 can include a central hub 36. The central hub 36 can be configured to extend upwardly through the elongated guide slot 25 defined by the expansion and contraction guide 16. The guide slot 25 can extend longitudinally along the axes of the expansion and contraction guide 16. When the backbone structure 12 is moved between the expanded and contracted states, the backbone segments 18 are free to slide along the expansion and contraction guide 16 with the central hubs 36 riding along/sliding within the guide slot so as to function as followers. The central hub 36 defines a socket 34 having a selected shape. In one example, the socket 34 has a cross-shape.

The lower section 30 can also include lateral extensions 37 that project laterally from opposite sides of the central hub 36. Each of the lateral extensions 37 can include a fiber guide structure 38 that defines a curved routing path for routing optical fiber structures (e.g., optical fibers, buffered optical fibers, fiber optic cables, buffer tubes, furcation tubes, etc.) upwardly from the basket 13 to the fiber management trays 14. In certain examples, portions of the fiber guide structures 38 can extend lower than the expansion and contraction guide 16 and into the basket 13 to facilitate routing optical fibers through the fiber guide structure 38 and to enhance stability.

Figure 12A:
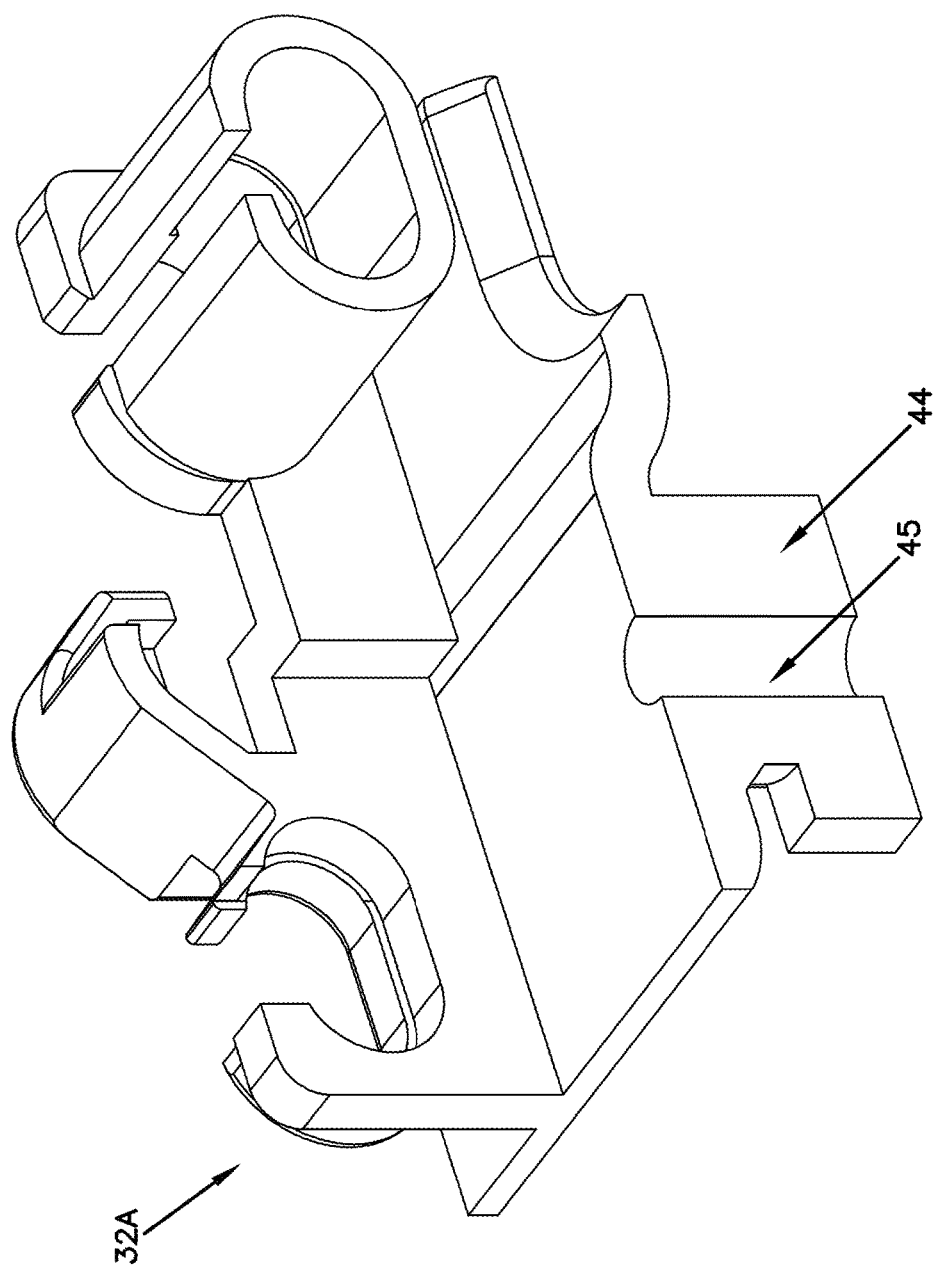
FIG. 12A shows an isolated perspective view of a first tray pivot of the backbone segment shown in FIG. 10.
Figure 12B:
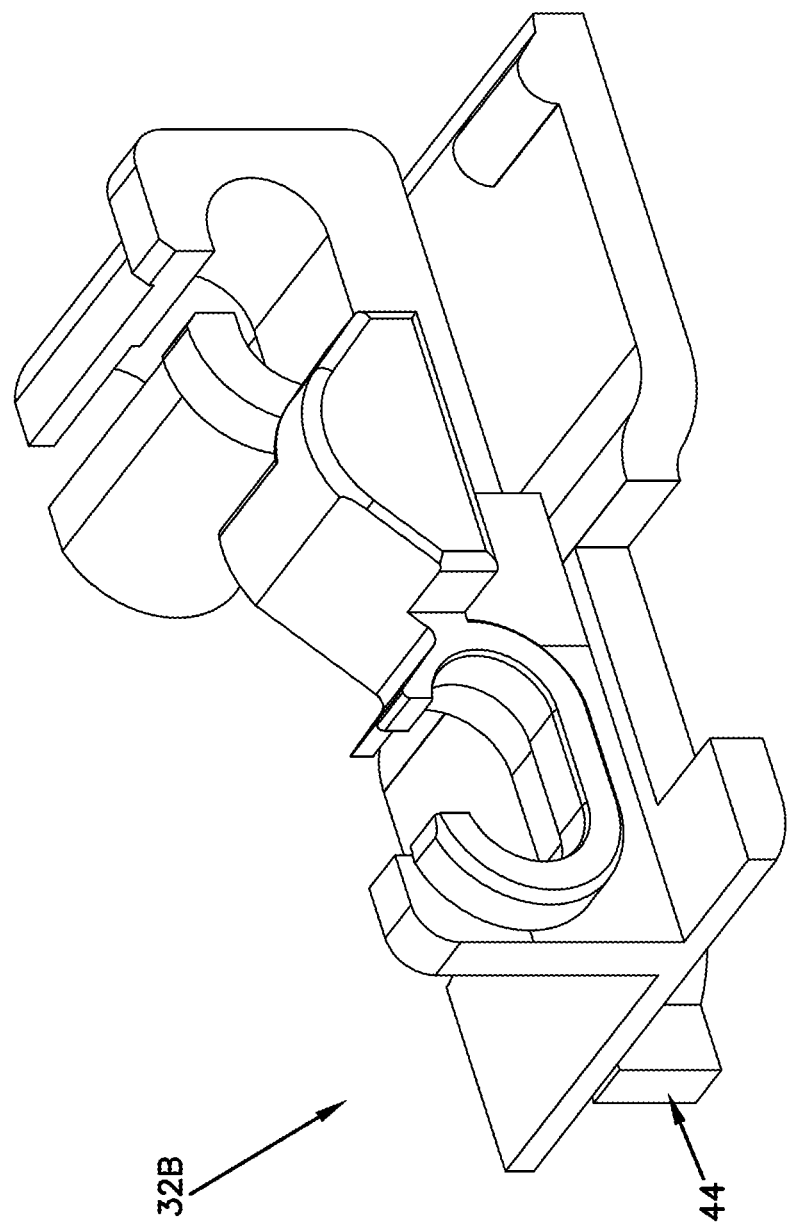
FIG. 12B shows an isolated perspective view of a second tray pivot of the backbone segment shown in FIG. 10.
Figure 13:
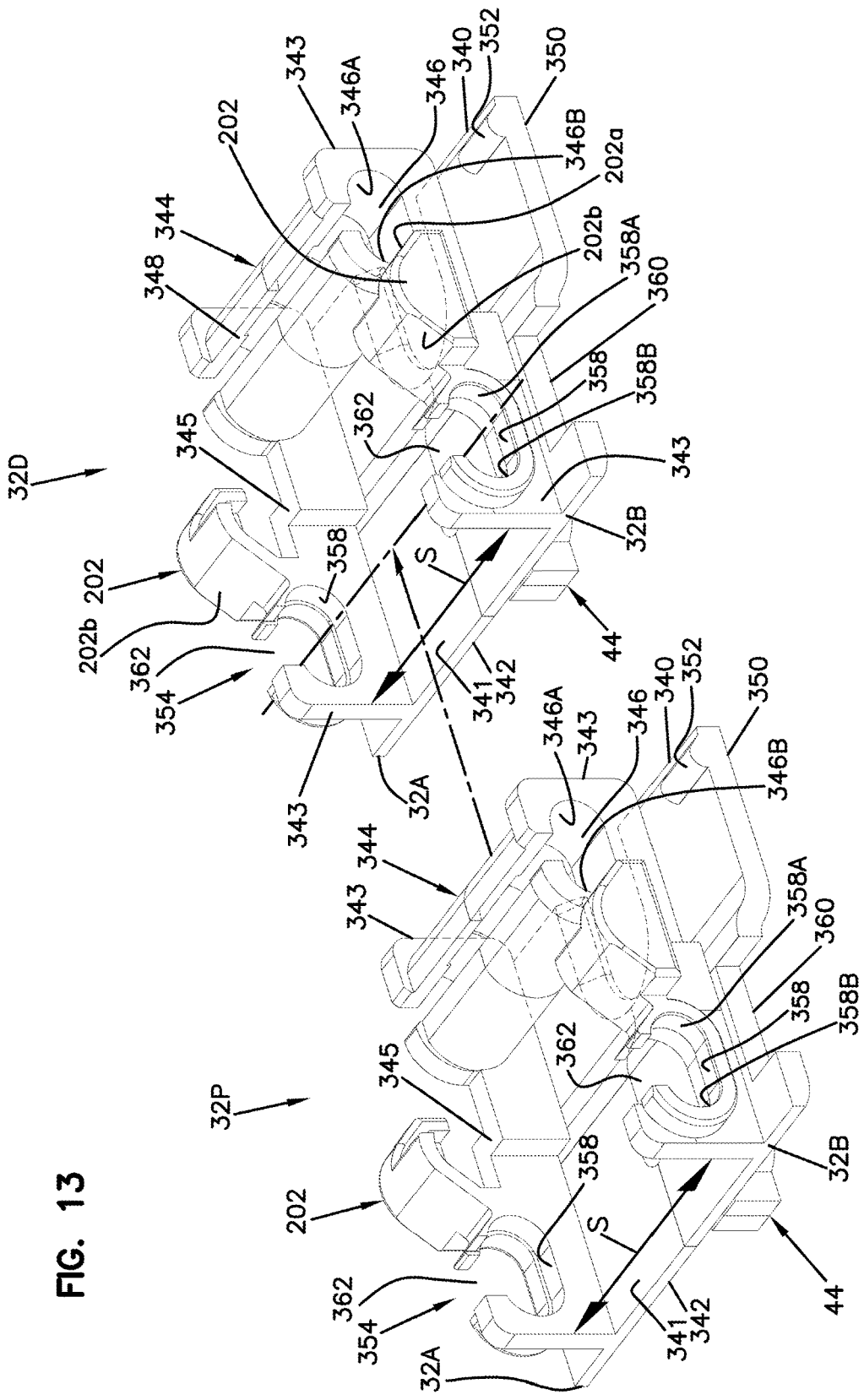
FIG. 13 shows a perspective view of the backbone segments as shown in FIG. 11 with the lower portions removed for clarity so that only the upper sections are shown.

As shown at FIGS. 12A, 12B and 13, the upper section 32 of one of the backbone segments 18 is formed by two half-pieces 32A, 32B that are constructed in the mirror-image of one another. The half-pieces 32A, 32B cooperate to define a boss 44 that fits within the socket 34 of the central hub 36 of the lower section 30 such that the upper and lower sections 30, 32 are coupled together. The boss 44 can define a shape that matches a shape of the socket 34 (e.g., a cross-shape). The boss 44 can define a fastener opening 45 that receives a fastener (i.e., a bolt, screw or other structure) for securing the boss 44 within the socket 34 such that the upper and lower sections 32, 30 are fixed together. As depicted, the fastener opening 45 can be defined when the two half-pieces 32A, 32B are aligned to secure within the socket 34.

Referring to FIG. 13, the upper section 32 of each backbone segment 18 includes a distal end 340 and proximal end 342. Each upper section 32 also includes a base 341 and opposite side walls 343 that extend between the distal and proximal ends 340, 342. The side walls 343 include an inward step 345 such that a spacing S between the side walls 343 is greater at the proximal end 342 as compared to the distal end 342. The distal end 340 includes a centrally located first pin receiver 344 defining a pin channel 346. The first pin receiver 344 is positioned between the side walls 343. The pin channel 346 includes an elongated slot having a distal end 346A and proximal end 346B. The first pin receiver 344 also includes a top slot 348 for accessing an interior of the pin channel 346. The distal end 340 of the upper section 32 further includes lateral clips 350 spaced below the first pin receiver 344. The clips 350 are laterally separated by a notch 352. Each of the clips 350 includes a retention tab 352.

The proximal end 342 of the upper section 32 includes a second pin receiver 354 defined across the two half-pieces 32A, 32B. The second pin receiver 354 is formed by elongated lateral pin openings 358 defined by the side walls 343. The lateral pin openings 358 are coaxially aligned and define distal and proximal ends 358A, 358B. The lateral pin openings 358 include top slots 362 for accessing interiors of the lateral pin openings 358. The proximal end 342 of the upper section 32 further includes laterally positioned slots 360.

Figure 14:
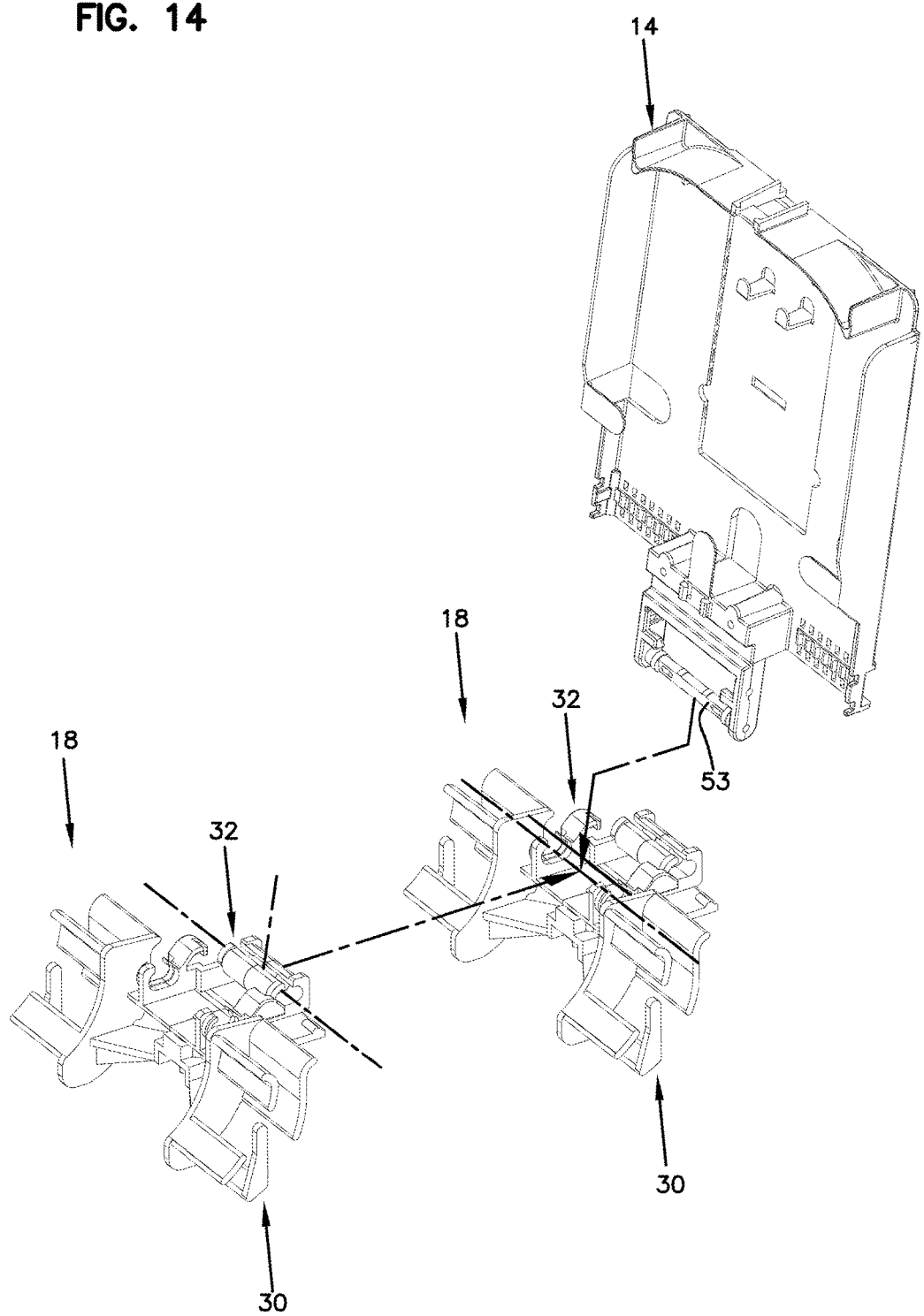
FIG. 14 shows a perspective view of two backbone segments as shown in FIG. 11 prepared for connection to one another, and shows a tray as shown in FIG. 9 prepared for connection to one of the backbone segments.
Figure 15:
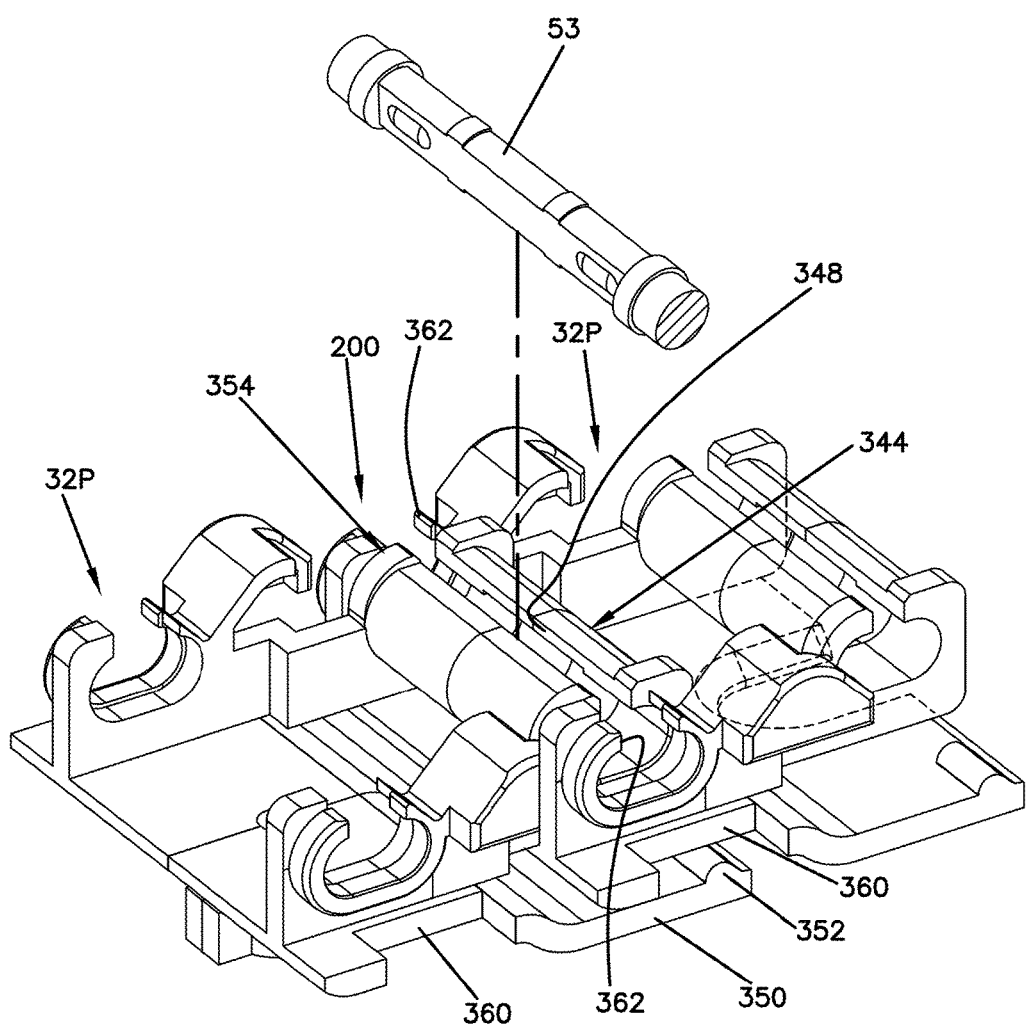
FIG. 15 shows a perspective view of the two backbone segments as shown in FIG. 14 connected in a proximal and distal relationship and prepared to receive the pin from the tray.

FIG. 14 shows two backbone segments 18 prepared for connection to one another. FIG. 13 shows the sections 18 of FIG. 14 with the lower portions 30 removed for clarity so that only the upper sections 32 are shown. As so positioned, the distal end 340 of a proximal upper section 32P aligns with the proximal end 342 of a distal upper section 32D. The proximal and distal upper sections 32P, 32D slide together, as shown at FIG. 15, causing the first pin receiver 344 to slide into the spacing S between the lateral walls 343 defining the lateral pin openings 358 of the second pin receiver 354. Also, the clips 350 at the distal end 340 of the proximal upper section 32P flex and snap to a position in which the retention tabs 352 are captured within the laterally positioned slots 360 at the proximal end 342 of the distal upper section 32D. It will be appreciated that the clips 350 and the laterally positioned slots 360 function to couple the proximal and distal upper sections 32P, 32D together while still allowing the proximal and distal upper sections to slide relative to one another along an axial distance equal to the lengths of the lateral slots 360. Contact between the retention tabs 352 and the ends of the lateral slots 360 limits the range of relative axial movement between the proximal and distal upper sections 32P, 32D.

Figure 16:
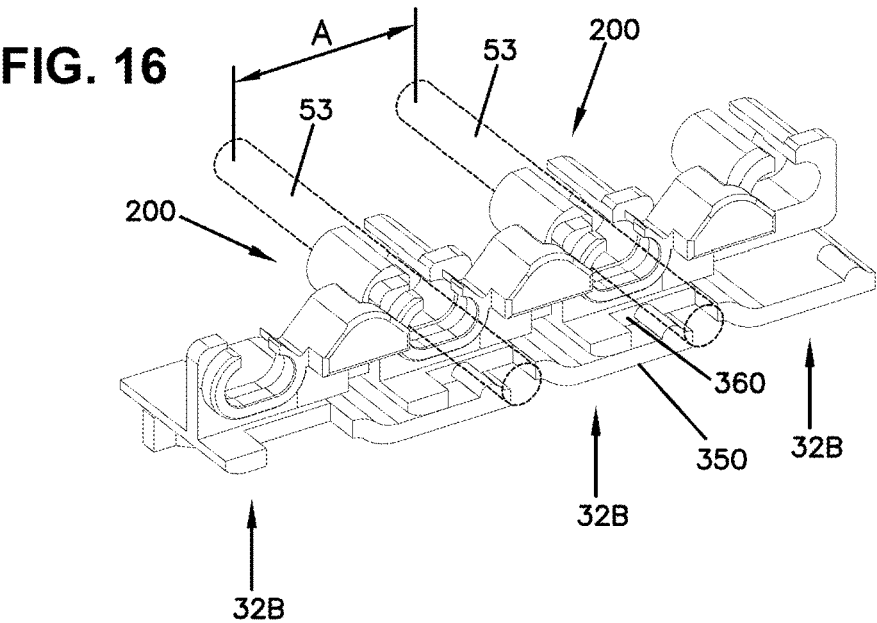
FIG. 16 shows a perspective view of a plurality of the second tray pivots shown in FIG. 11 assembled together with a pin, showing the assembled second tray pivots in a neutral position for receiving the trays and the pins separated a distance A.
Figure 19:
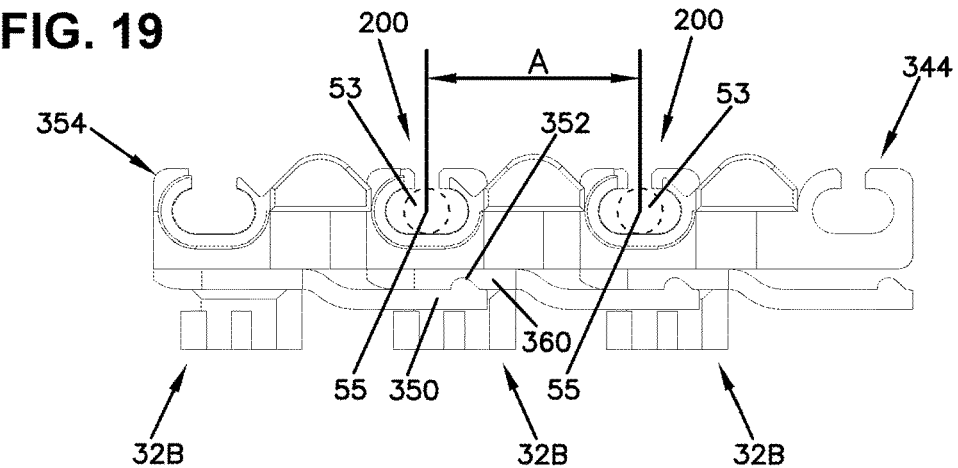
FIG. 19 shows a side view of the assembled second tray pivots in the neutral position as shown in FIG. 16.

With the distal end 340 of the proximal upper section 32P mated with the proximal end 342 of the distal upper section 32D, the pin channel 346 of the first (32P) pin receiver 344 aligns with the lateral pin openings 358 of the second (32D) pin receiver 354. By sliding the proximal and distal upper sections 32P, 32D to an intermediate position in which the retention tabs 352 are midway between the ends of the lateral slots 360, the top slot 348 of the first pin receiver 344 is placed in alignment with the top slots 362 of the second pin receiver 354. This intermediate position is shown at FIGS. 16, 19 and 15. In this position, one of the pivot pins 53 of one of the fiber management trays 14 can be snapped through the top slots 348, 362 into the aligned first and second pin receivers 344, 354. Once snapped in place, the pivot pin 53 provides an additional coupling between the proximal end 342 of the distal upper section 32D and the distal end 340 of the proximal upper section 32P.

The elongated configurations of the pin channel 346 and the lateral pin openings 358 allow the upper sections 32P, 32D to slide relative to one another between expanded and contracted positions. In the expanded position, as shown at FIGS. 18 and 21, the pin 53 is held securely between the proximal end 346B of the pin channel 346 and the distal ends 358A of the lateral pin openings 358 (see FIG. 13). In contrast, when the upper sections 32P, 32D are in the contracted position as shown at FIGS. 17 and 20, the pin 53 is held securely between the distal end 346A of the pin channel 346 and the proximal ends 358B of the lateral pin openings 348. In the intermediate position, the pin channel 346 is coaxially aligned with the lateral pin openings 348 (see FIGS. 16 and 19).

As shown in FIG. 13, pivot limiters 202 can be provided on the upper sections 32. The pivot limiters 202 can each include an angled distal stop surface 202A and an angled proximal stop surface 202B. The angled distal stop surfaces 202A can be notched to prevent interference between the adjacent upper sections 32P, 32D when these adjacent upper sections are moved to the contracted orientation.

The basket 13 can include a distal end 13A and a proximal end 13B. The proximal end 13B of the basket can generally coincide with the proximal end of the expansion and contraction guide 16. In use, optical fiber structures 11 can be routed into the basket 13 from the proximal end 13B of the basket 13. In certain examples, the optical fiber structures are directed along the length of the basket 13 and then routed in a loop 320 (see FIGS. 1 and 3) within the basket 13 before being routed through one of the fiber guide structures 308 upwardly to a predetermined one of the fiber management trays 14. In certain examples, the loop 320 can have a distal end 320A and a proximal end 320B. The loop 320 can be loosely contained within the basket 13 so that a length of the loop 320 can change as the expansion and contraction guide 16 is expanded and contracted. When the expansion and contraction guide 16 is contracted, the loop 320 can have a first length L1 (see FIG. 1) between the distal and proximal ends 320A, 320B. When the expansion and contraction guide 16 is extended, the loop 320 provides fiber length for accommodating the expansion of the expansion and contraction guide 16. This is accomplished through movement of the ends 320A, 320B of the loop 320 toward one another so that a length L2 (FIG. 3) of the loop 320 in the expanded state is shorter than the length L1 of the loop 320 in the contracted state. In certain examples, the optical fiber structure forming the loop 320 can include a protective tube (i.e., a furcation tube, a buffer tube, etc.) containing optical fibers. The protective tube can be routed through one of the fiber guide structures 308 and an end of the protective tube can be anchored to one of the tray bodies 15 at one of the tie-down locations 21. Fibers can be routed from the anchored end of the protective tube to the fiber management tray.

Figure 22:
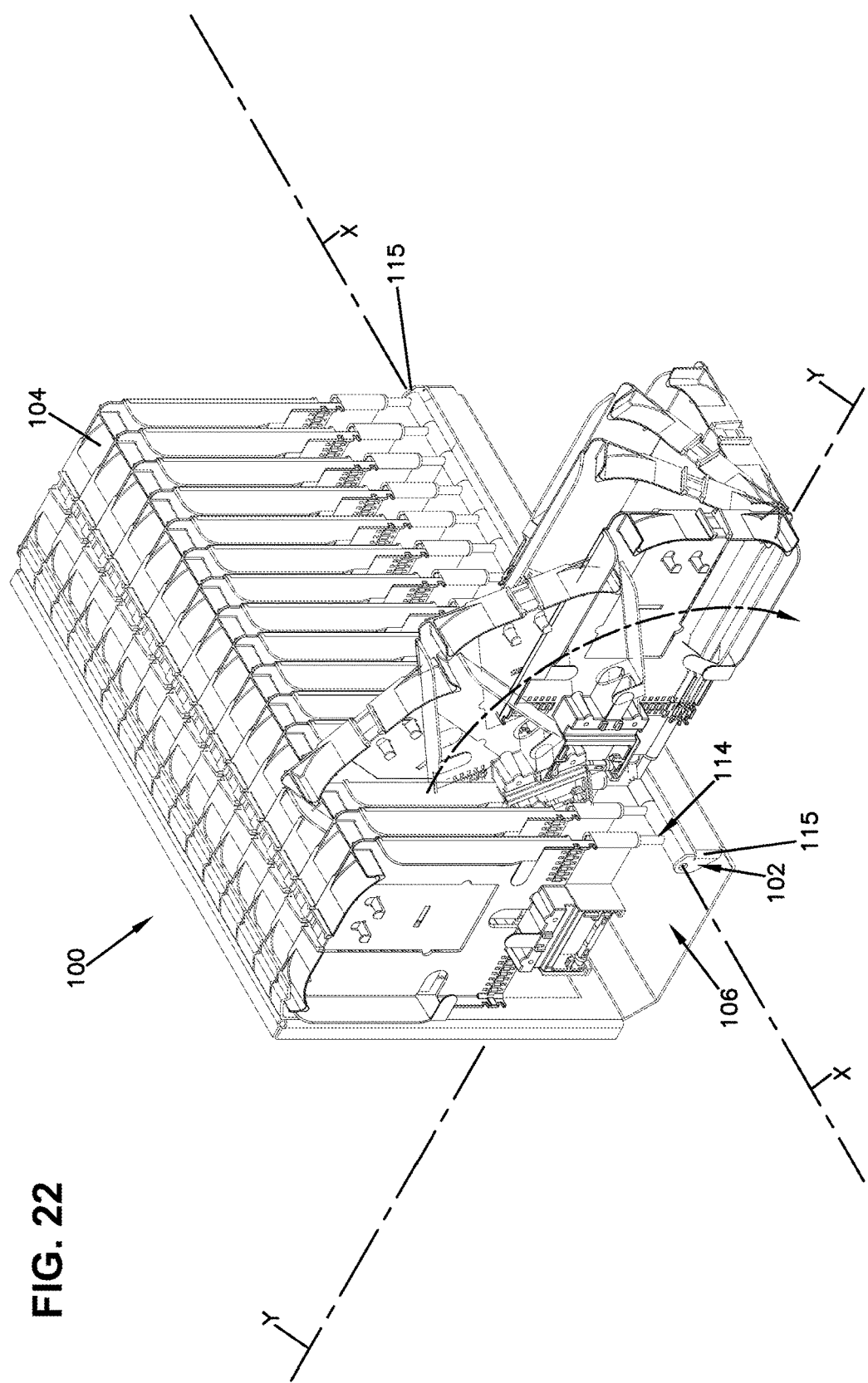
FIG. 22 shows a perspective view of a tray assembly for a fiber optic system according to another example embodiment of the present disclosure, showing a tray from the tray assembly transition from storage and through two different pivotal motions.
Figure 26:
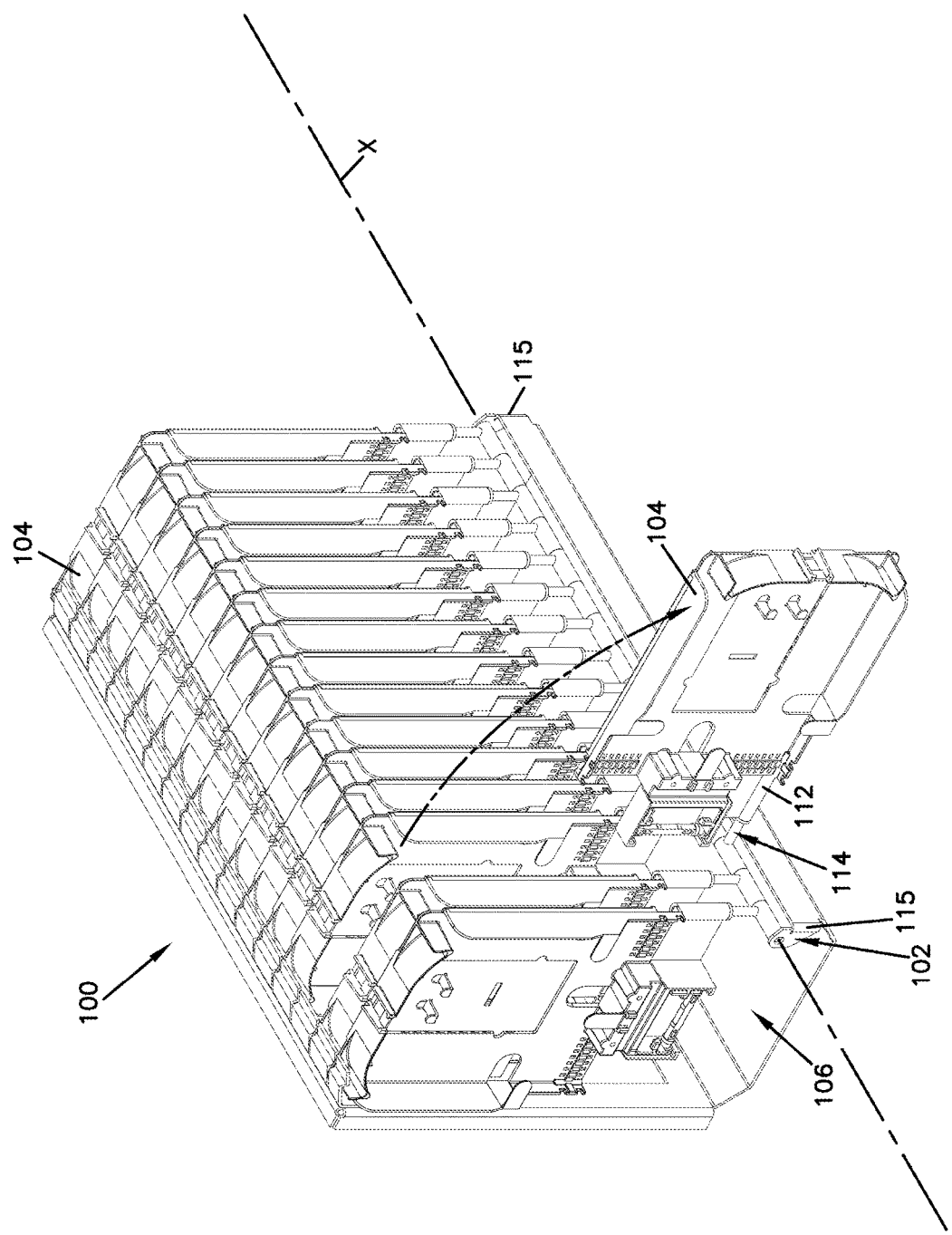
FIG. 26 shows a perspective view of the tray assembly shown in FIG. 22, showing a fiber storage tray pivoted away from the tray assembly along a first pivot axis.
Figure 27:
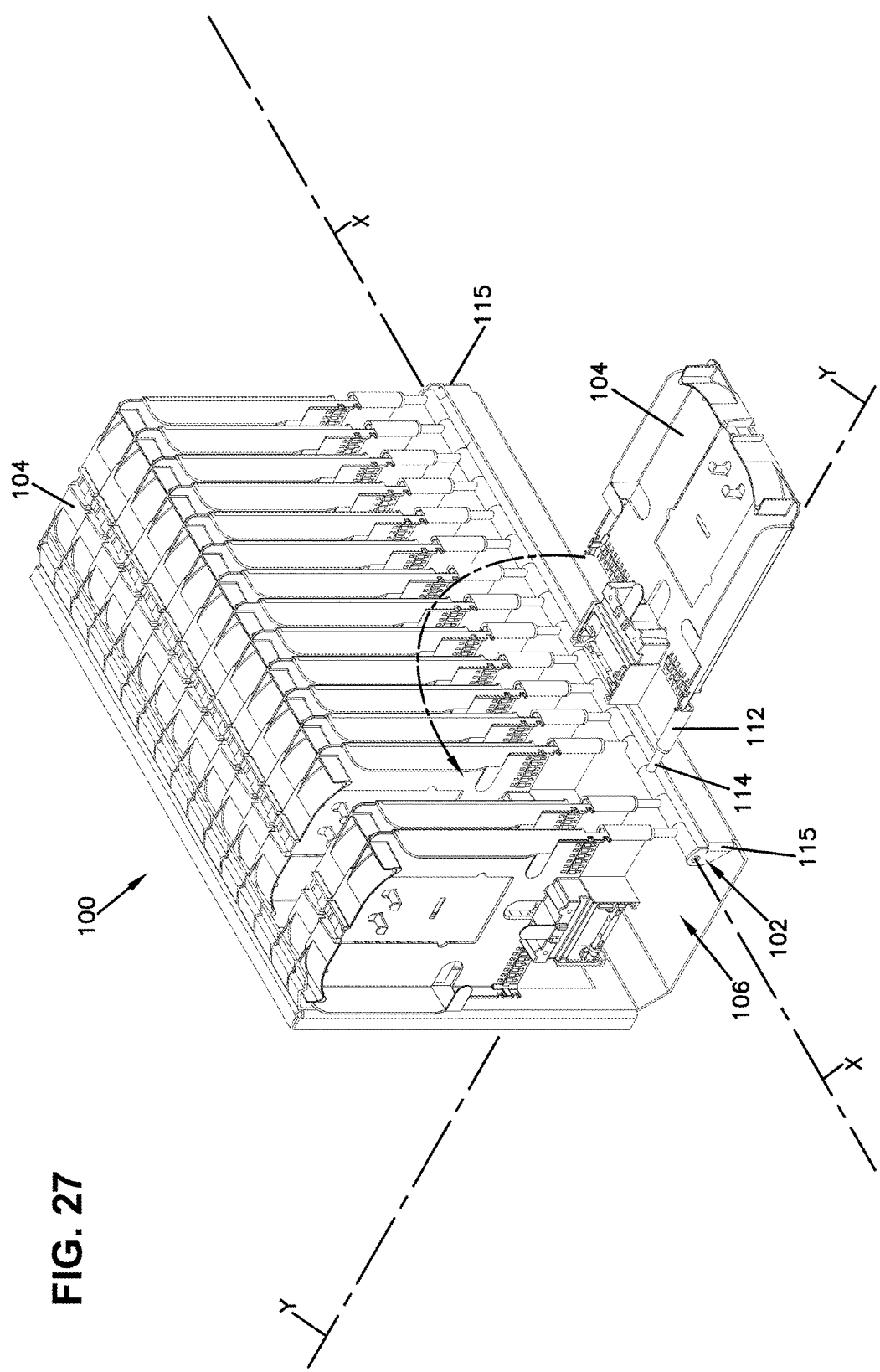
FIG. 27 shows a perspective view of the tray assembly shown in FIG. 22, showing the fiber storage tray pivoted downwardly along a second pivot axis.

FIG. 22 depicts a tray assembly 100 for a fiber optic system for storing optical fibers or cables. The tray assembly 100 includes a pivot mount 102 that is supported by a base 106 (e.g., a cradle or trough). The base 106 has a proximal end and a distal end. The pivot mount 102 has a proximal end and a distal end. The tray assembly 100 includes a stack of fiber management trays 104 that are connected to the pivot mount 102. The fiber management trays 104 are individually pivotally connected to the pivot mount 102 at a first pivot axis X by separate pivot linkages 114. As also depicted in FIG. 26, the pivot linkages 114 are configured to allow the trays 104 to pivot about the first pivot axis X to individually pivot the fiber management trays from stowed positions aligned with the stack to working positions offset from stack. As also depicted in FIG. 27, the pivot linkages 114 are also configured to allow the trays 104 to pivot about second pivot axes Y after the trays have been pivoted out from the stack along the first pivot axis X to the working positions. The fiber management trays 104 are positioned adjacent one another with respect to the base 106 along a length of the first pivot axis X when in the stowed positions. The second pivot axes Y each correspond to one of the fiber management trays 104 being spaced apart from one another along the length of the first pivot axis X.

Figure 23:
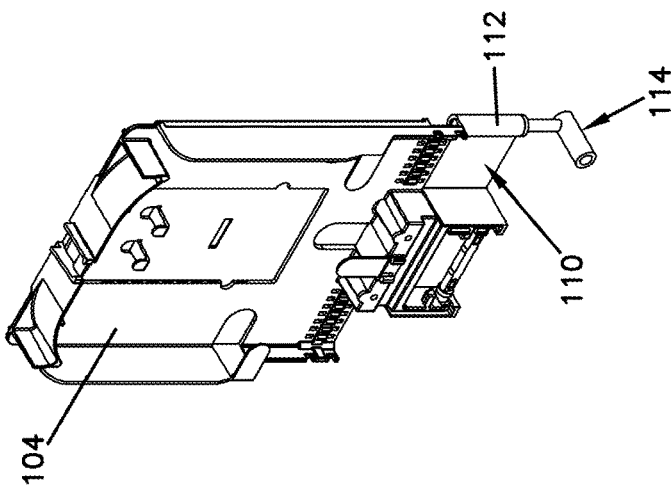
FIG. 23 shows a perspective view of a fiber storage tray removed from the tray assembly shown in FIG. 22.

FIG. 23 shows a perspective view of one of the fiber management trays 104 removed from the assembly 100 shown in FIG. 19. The depicted fiber management tray 104 includes a bracket 110 that supports the tray and receives the pivot linkage 114 within a receiver 112. The pivot linkage 114 can be removable from the receiver 112.

Figure 24:
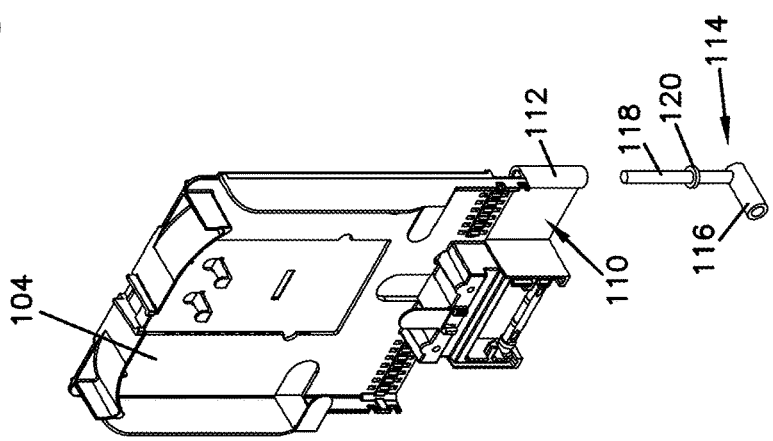
FIG. 24 shows a perspective view of the fiber storage tray shown in FIG. 22, showing the pivot linkage separate from the fiber storage tray.

FIG. 24 shows a perspective view of the pivot linkage 114 removed from the receiver 112. As depicted, the pivot linkage 114 has a male insert 118 that inserts into the receiver 112 a distance terminated by a stopper 120 along the insert. The pivot linkage 114 also has a mounting arm 116 (i.e., a sleeve or collar) that secures to the pivot mount 102 shown in FIG. 19. The depicted mounting arm 116 can have a hollow cylindrical shape with open ends. The mounting arm 116 can receive the pivot mount 102 within and through the hollow center. The mounting arm 116 can pivot along axis X with respect to the pivot mount 102. The pivot mount 102 can be any structure that can extend through a plurality of adjacent mounting arms between the proximal and distal ends of the tray assembly, as would be understood by a person of ordinary skill in the art. For example, the pivot mount 102 can be an elongated (e.g., a shaft) structure extending between supports 115 at the proximal and distal ends. The plurality of mounting arms 116 can be fit around the pivot mount 102 before the pivot mount is secured between the proximal and distal supports.

Figure 25:
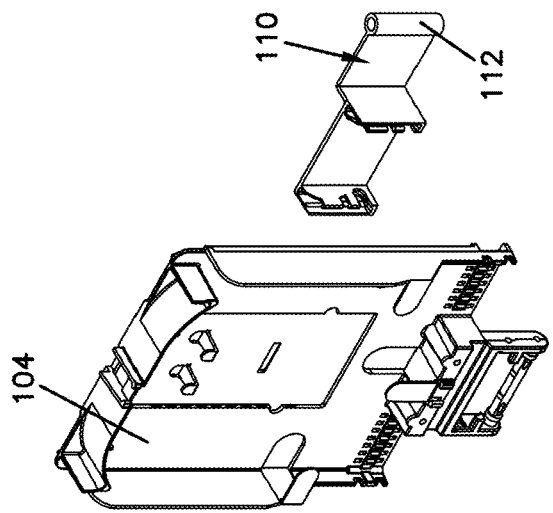
FIG. 25 shows a perspective view of the fiber storage tray shown in FIG. 22, showing the mounting bracket separate from the fiber storage tray.

FIG. 25 depicts the bracket 110 removed from the fiber management tray 104. As depicted, the fiber management tray 104 can have a common structure to the fiber management tray described above with respect to FIG. 12. As shown, the receiver 112 on the bracket 110 can have a hollow cylinder to receive the insert 118. After the tray 104 is pivoted along axis X away from the tray assembly 100, the receiver 112 can pivot about the insert 118 along axis Y. As a result, the pivot mount 104 and the pivot linkage 114 allow the fiber storage trays 104 to pivot along multiple axes, for example X and Y, with respect to the support 106. As depicted, axis X and axis Y can be perpendicular to each other.

Figure 28:
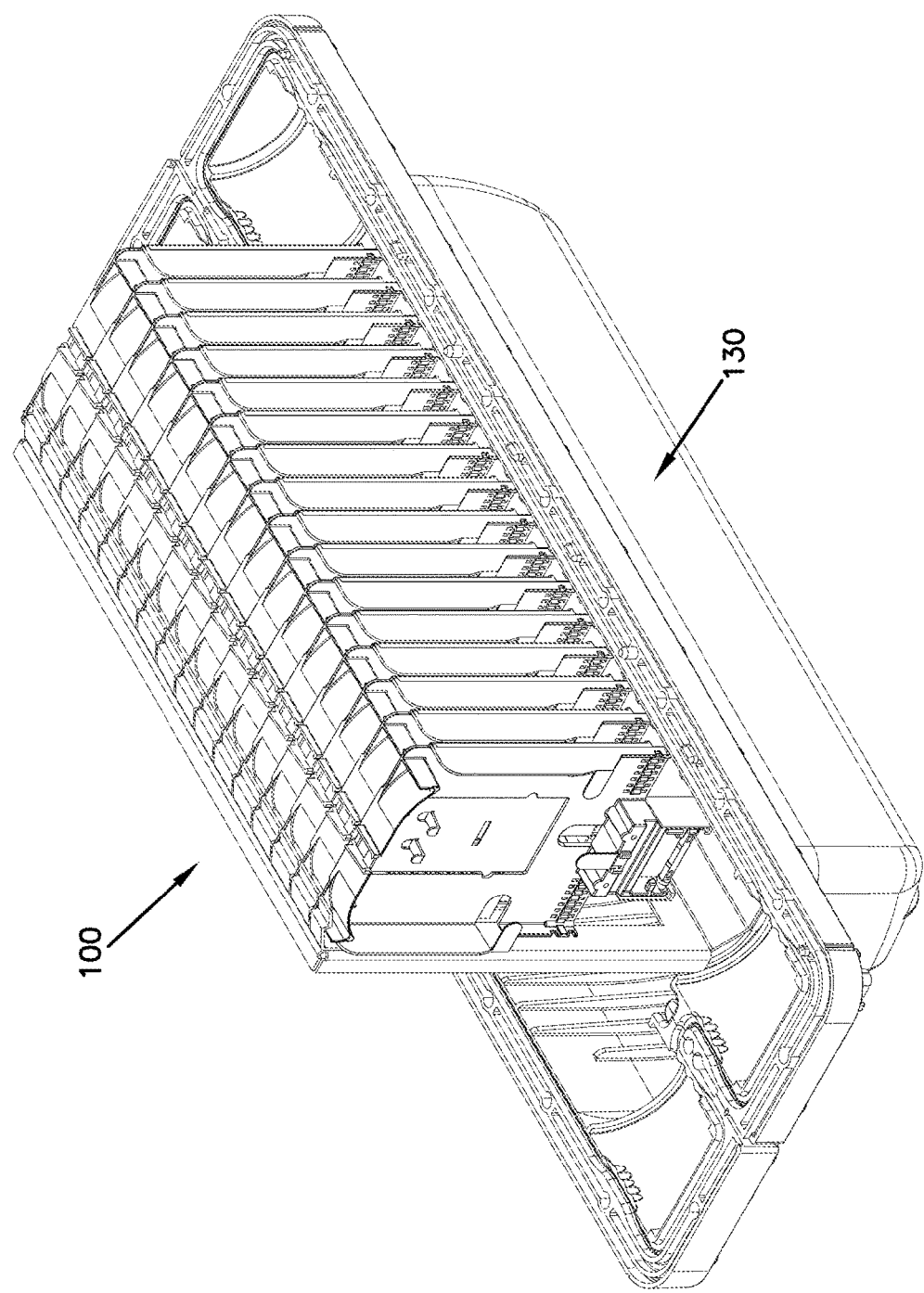
FIG. 28 shows a perspective view of the tray assembly shown in FIG. 22, shown in storage within the bottom half of a fiber tray storage cabinet (i.e., a closure/enclosure).

FIG. 28 shows the tray assembly in storage placed within a fiber tray storage enclosure 130 (e.g., case, closure, housing, cabinet, etc.). In order to access the trays through the pivotal motion described above, the tray assembly 100 is removed from the enclosure 130 by lifting the base 106. As depicted in FIG. 29, during storage, the enclosure 130 can include a top 132 to protect the tray assembly.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A tray assembly for a fiber optic system to organize optical fibers, the tray assembly comprising:
    a backbone structure including a plurality of backbone segments that are connected together and are positioned along an expansion/contraction axis of the backbone structure; and
    a stack of fiber management trays connected to the backbone structure, each of the fiber management trays being pivotally connected to the backbone segments at a pivot axis;
    the backbone segments being moveable relative to one another along the expansion/contraction axis to allow the backbone structure to be moved between an expanded state and a contracted state, the backbone structure having a longer length measured along the expansion/contraction axis in the expanded state as compared to the contracted state, the pivot axes of the fiber management trays being closer together when the backbone structure is in the contracted state as compared to the expanded state.

2. The tray assembly of claim 1, further comprising an expansion/contraction guide defined along the expansion/contraction axis, wherein the expansion/contraction guide supports the backbone structure.

3. The tray assembly of claim 2, wherein the expansion/contraction guide comprises a telescopic extender to extend the length of the expansion/contraction guide along the expansion/contraction axis.

4. The tray assembly of claim 1, wherein the expansion/contraction axis comprises a proximal end and a distal end and the backbone structure comprises a proximal backbone segment fixed to the expansion/contraction axis proximal end and a distal backbone segment fixed to the expansion/contraction axis distal end.

5. The tray assembly of claim 1, wherein the backbone segments comprise a fiber guide that controls bend radius of the optical fibers.

6. The tray assembly of claim 1, further comprising a basket for supporting the optical fibers, wherein the basket extends in parallel to the expansion/contraction axis.

7. The tray assembly of claim 1, wherein the backbone segments comprise a pivot receiver and the fiber management trays comprise a pivot pin, wherein the pivot pin is pivotally secured to the pivot receiver to pivot relative to the pivot receiver.

8. A method for storing a stack of optical fiber management trays, the method comprising:
    securing the stack of optical fiber management trays to pivot axes that allows the optical fiber management trays to individually pivot with respect to each other; and
    securing the pivot axes to a base with connectors to retain the optical fiber management trays in pivotal alignment with respect to each other;
    wherein the base comprises an expansion/contraction axis and the connectors movably secure to the expansion/contraction axis.

9. The method of claim 8, wherein the base is a pivot mount and the connectors are pivot linkages that pivot the optical fiber management trays along two different axes relative to the pivot mount.

10. The method of claim 9, wherein the two different axes are perpendicular relative to each other.

11. The method of claim 8, wherein the connectors are connected to each other such that adjoining connectors can expand away or contract towards each other.

12. The method of claim 11, wherein the expansion/contraction axis comprises a proximal end and a distal end, and one of the connectors is fixed to the axis proximal end and one of the connectors is fixed to the axis distal end.

13. The method of claim 12, wherein the expansion/contraction axis comprises an extender to telescopically extend the length of the expansion/contraction axis, wherein the connectors expand apart from each other when the extender telescopically extends the length of the expansion/contraction axis.

* * * * *